United States Patent [19]

Tahara et al.

[11] Patent Number: 5,395,711
[45] Date of Patent: Mar. 7, 1995

[54] NON-AQUEOUS ELECTROLYTE SECONDARY BATTERY AND ITS PRODUCTION METHOD

[75] Inventors: Kensuke Tahara; Hideki Ishikawa, both of Sendai; Fumiharu Iwasaki, Tokyo; Seiji Yahagi, Tokyo; Akifumi Sakata, Tokyo; Tsugio Sakai, Sendai, all of Japan

[73] Assignees: Seiko Instruments Inc.; Seiko Electronic Components Ltd., Japan

[21] Appl. No.: 97,714

[22] Filed: Jul. 27, 1993

[30] Foreign Application Priority Data

| Jul. 29, 1992 | [JP] | Japan | 4-202383 |
| Oct. 2, 1992 | [JP] | Japan | 4-265179 |
| Feb. 24, 1993 | [JP] | Japan | 5-035851 |
| Mar. 3, 1993 | [JP] | Japan | 5-043058 |
| Mar. 19, 1993 | [JP] | Japan | 5-060520 |
| Jun. 30, 1993 | [JP] | Japan | 5-162958 |

[51] Int. Cl.[6] .................................................. H01M 6/14
[52] U.S. Cl. .................................. 429/197; 429/218
[58] Field of Search .................. 429/194, 218, 197, 245

[56] References Cited

U.S. PATENT DOCUMENTS

| 4,786,499 | 11/1988 | Slane et al. | 429/197 |
| 4,935,316 | 6/1990 | Redey | 429/218 X |
| 4,950,566 | 8/1990 | Huggins et al. | 429/218 |
| 4,957,833 | 9/1990 | Daifuku et al. | 429/197 |
| 4,996,129 | 2/1991 | Tuck | 429/194 |
| 5,013,620 | 5/1991 | Miyazaki et al. | 429/194 |
| 5,278,005 | 1/1994 | Yamauchi et al. | 429/194 |

FOREIGN PATENT DOCUMENTS 0414902 3/1991 European Pat. Off. .
0484187 5/1992 European Pat. Off. .

*Primary Examiner*—Anthony Skapars
*Attorney, Agent, or Firm*—Bruce L. Adams; Van C. Wilks

[57] ABSTRACT

A non-aqueous electrolyte secondary battery has a negative electrode, a positive electrode and a lithium ion-conductive non-aqueous electrolyte. A silicon oxide or a silicate containing lithium is used as the negative electrode active material. The potential of the negative electrode active material is low, the charge and discharge capacity in a base potential region of 0-1 V with respect to metallic lithium is large, and the polarization (internal resistance) during charge and discharge is small. A secondary battery having a high voltage and a high energy density is obtained in which large current charge and discharge characteristics are facilitated, the deterioration due to excessive charge and excessive discharge is reduced, the cycle life is long and the reliability is high.

15 Claims, 12 Drawing Sheets

NON-AQUEOUS ELECTROLYTE SECONDARY BATTERY AND ITS PRODUCTION METHOD

BACKGROUND OF THE INVENTION

The present invention relates to a non-aqueous electrolyte secondary battery using a material capable of absorbing and releasing lithium as a negative electrode active material in which a lithium ion-conductive non-aqueous electrolyte is used, and in particular relates to a novel negative electrode active material and an electrolyte and a positive electrode active material suitable therefor for providing a novel secondary battery having a high voltage and a high energy density in which charge and discharge characteristics are excellent, the cycle life is long, and reliability is high.

The non-aqueous electrolyte battery which uses lithium as a negative electrode active material has been widely used in electric sources for a memory back-up, cameras and the like as a primary battery owing to advantages such as a high voltage, a high energy density, small self-discharge, excellent long-term reliability and the like. However, in recent years, in accordance with remarkable progress of compact type electronic instruments, communication instruments and the like, various instruments which require large current outputs for a battery as an electric source have been provided and from viewpoints of economics and realization of compact and light weight instruments, a secondary battery which is repeatedly rechargeable and has a high energy density is strongly demanded. Thus, active researches and developments have been done for developing a secondary battery from the above-mentioned non-aqueous electrolyte battery having the high energy density, a part of which is practically carried out, but still insufficient in the energy density, charge and discharge cycle life, reliability and the like.

In the prior art, as the positive electrode active material for constituting a positive electrode of such a secondary battery, there have been found the following three types of charge and discharge reaction. The first type includes metal chalcogenide such as $TiS_2$, $MoS_2$, NbSe, and the like, and metal oxide such as $MnO_2$, $MoO_3$, $V_2O_5$, $Li_xCoO_2$, $Li_xNiO_2$, $Li_xMn_2O_4$ and the like. In this type only lithium ion (cation) enters into and exits from spaces between layers and lattice positions or gaps between lattices of crystals in accordance with the intercalation and deintercalation reactions and the like. The second type includes conductive polymers such as polyaniline, polypyrrole, polyparaphenylene and the like, and in this type mainly only anion stably enters and exits in accordance with the doping and undoping reactions. The third type includes graphite intercalation compounds, conductive polymers such as polyacene and the like, and in this type both lithium cation and anion can enter and exit (in accordance with intercalation, deintercalation, or doping, undoping and the like).

On the other hand, as the negative electrode active material for constituting a negative electrode of such a battery, the electrode potential is basest when metal lithium is used alone, so that a battery combined with the positive electrode using the positive electrode active material as described above has the highest output voltage and also high energy density. However, a problem exists in that dendrite and passivation compounds are generated on the negative electrode in accordance with charge and discharge, deterioration due to charge and discharge is large, and the cycle life is short. In order to solve these problems, it has been proposed that materials capable of absorbing and releasing lithium ion be used as the negative electrode active material: (1) alloy of lithium and other metals such as Al, Zn, Sn, Pb, Bi, Cd and the like, (2) intercalation compounds or insertion compounds in which lithium ion is incorporated into a crystal structure of inorganic compounds such as $WO_2$, $MoO_2$, $Fe_2O_2$, $TiS_2$ and the like, graphite, carbonaceous materials obtained by calcining organic compounds and the like, and (3) conductive polymers such as polyacene, polyacetylene and the like in which lithium ion is doped.

Generally, however, when a battery is constituted by combining a negative electrode using a material capable of absorbing and releasing lithium ion other than metal lithium, as described above as the negative electrode active material, and a positive electrode using a positive electrode active material as described above, the electrode potential of such a negative electrode active material is nobler than that of metal lithium. The result is that there is such a drawback that an operating voltage of the battery is fairly lower as compared with a case in which metal lithium is used alone as the negative electrode active material. For example, the working voltage lowers by 0.2 to 0.8 V in the case of the use of an alloy of lithium and Al, Zn, Pb, Sn, Bi, Cd and the like, by 0 to 1 V in the case of a carbon-lithium intercalation compound, or by 0.5 to 1.5 V in the case of a lithium ion insertion compounds such as $MoO_2$, $WO_2$ and the like.

In addition, since elements other than lithium serve as negative electrode constituting elements, capacities per volume and per weight and the energy density considerably lowers.

Further, when the alloy of lithium and another metal of the above-mentioned (1) is used, there are such problems that the utilization efficiency of lithium is low during charge and discharge, and that the cycle life is short due to occurrence of cracks in the electrode to generate splits on account of repeated charge and discharge. In the case of the lithium intercalation compound or inclusion compound of (2), excessive charge and discharge cause deterioration such as decay of the crystal structure and generation of irreversible substances. In addition there is drawback that the output voltage of a battery using such materials is low because the electrode potential is high (noble) in many cases. In the case of the conductive polymer of (3), there is such a problem that the charge and discharge capacity, especially the charge and discharge capacity per volume, is small.

Thus, in order to obtain a secondary battery having a high voltage and a high energy density in which the charge and discharge characteristics are excellent and the cycle life is long, a negative electrode active material is necessary in which the electrode potential with respect to lithium is low (base), there is no deterioration such as decay of the crystal structure and generation of irreversible substances due to absorption and release of lithium ion during charge and discharge, and an amount capable of reversibly absorbing and releasing lithium ion that is, an effective charge and discharge capacity, is larger.

On the other hand, with respect to the above-mentioned positive electrode active materials, the first type generally has a large energy density but has a drawback that the deterioration is large due to decay of crystals, generation of irreversible substances and the like in case of excessive charge and excessive discharge. In addition, in the case of the second and the third types, on the contrary, there is such a drawback that the charge and discharge capacity, especially the charge and discharge capacity per volume and the energy density, are small.

Thus, in order to obtain a secondary battery having a high capacity and a high energy density in which the excessive charge characteristic and the excessive discharge characteristic are excellent, a positive electrode active material is necessary in which there is neither decay of crystals nor generation of irreversible substances due to excessive charge and excessive discharge, and the amount of lithium ion which is repeatedly absorbed and released is larger.

SUMMARY OF THE INVENTION

An object of the present invention is to provide a non-aqueous electrolyte secondary battery using a material capable of absorbing and releasing lithium as a negative electrode active material.

Another object of the present is to provide a novel secondary battery having a high voltage and a high energy density in which charge and discharge characteristics are excellent, the cycle life is long, and reliability is high.

Still another object of the present invention is to provide a non-aqueous electrolyte secondary battery using a silicon oxide or a silicate containing lithium as a negative electrode active material.

A further object of the present invention is to provide a method for producing a non-aqueous electrolyte secondary battery in which an electrochemical reaction between a silicon oxide or a silicate and lithium or a material containing lithium is used to incorporate lithium ion into the silicon oxide or the silicate so as to obtain the silicon oxide or the silicate containing lithium.

In order to solve the problems as described above, the present invention proposes a use of a novel material capable of absorbing and releasing lithium ion comprising a silicon oxide or a silicate containing lithium as a negative electrode active material for such a battery. Namely, a composite oxide of lithium and silicon is used which contains lithium in a crystal structure or an amorphous structure of the silicon oxide or the silicate, and is capable of absorbing and releasing lithium ion by an electrochemical reaction in a non-aqueous electrolyte. It is preferable that the state of lithium in the composite oxide be mainly ion, however, there is necessarily no limitation thereto.

As preferable production methods for the silicon oxide or the silicate containing lithium to be used as the negative electrode active material for the battery of the present invention there are exemplified the following two kinds of methods, however, there is no limitation thereto. The first method is a method in which each simple substance of lithium and silicon and another metallic element or non-metallic element, or compounds thereof are mixed in a predetermined mole ratio, which are heated in air or in an atmosphere containing oxygen to perform synthesis. As each of the compounds of lithium and silicon and the other metallic element and non-metallic element to serve as starting raw materials, compounds which generate oxides by heating in air or in an atmosphere containing oxygen such as each oxide, hydroxide, or salt such as carbonate, nitrate, organic compounds and the like are available. When the compounds of each oxide, hydroxide or other compounds having oxygen are used as each of the compounds of lithium and silicon, it is also possible to heat and synthesize them in a non-oxidized atmosphere such as in an inert atmosphere, in vacuum and the like or in an atmosphere in which the amount of oxygen is restricted. Among these starting raw materials, lithium oxide $Li_2O$, lithium peroxide $Li_2O_2$, lithium hydroxide LiOH, lithium carbonate $Li_2CO_3$, lithium nitrate $LiNO_3$ and the like as the compound of lithium; silicon oxides such as silicon dioxide $SiO_2$, silicon monoxide SiO and the like, hydrates thereof, silicic acids such as orthosilicic acid $H_4Si_2O_5$, metasilicic acid $H_2SiO_3$, metabisilicic acid $H_2Si_2O_5$, other condensed silicic acids and the like as the compound of silicon are especially preferable, because they easily decompose by heating, easily generate oxides, and easily make solid solutions. In addition, it is also possible that these starting raw materials are dissolved or dispersed in a solvent such as water, alcohol, glycerol and the like, which are homogeneously mixed and/or reacted in the solution, and then dried to perform the above-mentioned heating treatment. In particular, according to a method in which silicic acid or silicon oxide as described above or an aqueous solution thereof is added to an aqueous solution of lithium hydroxide by a predetermined amount to dissolve, and the reacted material is dried and dehydrated followed by performing the above-mentioned heating treatment, there is such an advantage that a more homogeneous product is obtained by the heating treatment at a lower temperature. The heating temperature differs depending also on starting materials and a heating atmosphere. However, usually the synthesis is possible at not less than 400° C., and the temperature is preferably not less than 800° C., and more preferably not less than 1100° C. Examples of the silicon oxide containing lithium obtained by such a heating treatment of the mixture of the lithium compound and the silicon compound are exemplified by those having these stoichiometric composition such as various lithium silicate such as $Li_4SiO_4$, $Li_2SiO_3$, $Li_2Si_2O_5$, $Li_4Si_3O_8$, $Li_6Si_4O_{11}$ and the like and condensed substances thereof, and those having non-stoichiometric compositions in which lithium is excessive or deficient. In addition, when as the starting raw materials, various silicic acids as described above are used as the silicon compound, and when lithium hydroxide or the like is used as the lithium compound, hydrogen is not completely released by the heating treatment, a part of which remains in a product after the heat treatment, and it is also possible to allow lithium and hydrogen to exist together, according to the present invention. Further, lithium or the compound thereof, and the following substances are simultaneously added simple substances of other alkali metals such as sodium, potassium, rubidium and the like; alkaline-earth metals such as magnesium, calcium and the like; and/or other metallic or non-metallic elements such as iron, nickel, manganese, vanadium, titanium, lead, aluminum, germanium, boron, phosphorus and the like or compounds thereof. Thereafter, silicon or the compound thereof is mixed to it so as to perform the heating treatment, thus it is also possible to allow these metal ions or non-metals other than lithium to exist together with lithium ion and silicon, and these cases are also included in the present invention.

With respect to the silicon oxide or the silicate containing lithium obtained as described above, it can be used as the negative electrode active material as it is or after applying processing such as grinding and grading, granulation and the like, if necessary, or in the same manner as the following second method, in accordance with an electrochemical reaction of the silicon oxide or the silicate containing lithium and lithium or a material containing lithium, lithium ion is further incorporated into the silicon oxide or the silicate containing lithium, or inversely lithium ion is released from the silicon oxide or the silicate containing lithium. Thus, a negative electrode active in which the lithium amount is increased or decreased may be used as the negative electrode active material.

The second method is a method in which an electrochemical reaction between a silicon oxide such as silicon dioxide $SiO_2$, silicon monoxide SiO and the like or a silicate such as $CaSiO_3$, $MgSiO_3$, $Zn_2SiO_4$ and the like and lithium or a material containing lithium is used to incorporate lithium ion into the silicon]oxide or the silicate so as to obtain the silicon oxide or the silicate containing lithium. As the silicate, artificially synthesized ones obtained according to the above-mentioned first method, as well as various silicates obtained from minerals, can be also used.

In addition, as the material containing lithium for for the electrochemical reaction, for example, active materials capable of absorbing and releasing lithium ion can be used, such as those used in the prior art for the positive electrode active material, the negative electrode active material and the like.

The incorporation of lithium ion by the electrochemical reaction into the silicon oxide or the silicate can be performed inside the battery after assembling the battery, or inside the battery or outside the battery during battery production steps, which can be concretely performed as follows. Namely, (1) one in which the silicon oxide or the silicate or a mixed agent of the two and a conductive agent, a binding agent and the like is molded into a predetermined shape is used as one electrode (working electrode), metallic lithium or a material containing lithium is used as another electrode (counter electrode), and both electrodes are opposed and in contacting with a lithium ion-conductive non-aqueous electrolyte so as to constitute an electrochemical cell current application is performed with a suitable current in a direction to allow the working electrode to conduct the cathode reaction so as to electrochemically incorporate lithium ion into the silicon oxide or the silicate. The resulting working electrode is used as a negative electrode as it is or as a negative electrode active material for constituting a negative electrode so as to constitute a non-aqueous electrolyte secondary battery. (2) The silicon oxide or the silicate or a mixed agent of the two and a conductive agent, a binding agent and the like is molded into a predetermined shape, to which lithium, a lithium alloy or the like is applied by pressure or contacted to make a laminated electrode which is used as a negative electrode to incorporate into a non-aqueous electrolyte secondary battery. There is given a method in which the laminated electrode contacts with the electrolyte inside the battery, thereby a kind of local cell is formed to perform self-discharge, and the lithium is electrochemically absorbed by the silicon oxide or the silicate. (3) A non-aqueous electrolyte secondary battery is constituted in which the silicon oxide or the silicate is used as a negative electrode active material, and the lithium-containing material capable of absorbing and releasing lithium ion is used as a positive electrode active material. There is given a method in which charging is performed during the use as a battery, thereby lithium ion released from the positive electrode is incorporated into the silicon oxide or the silicate.

The silicon oxide or the silicate containing lithium obtained as described above is used as the negative electrode active material.

Further, the present inventors have found that the chemical composition of the above-mentioned silicon oxide containing lithium, especially the ratio of the oxygen atom number to the silicon atom number, considerably affects the performance of electrochemical absorption and release of lithium ion in the non-aqueous electrolyte, that is the charge and discharge performance.

As the silicon oxide, silicon dioxide $SiO_2$ is most stable, which is well known in forms of quartz crystal, amorphous silica (glass) and the like. It has been found that as compared with silicon dioxide $SiO_2$, lithium silicate $Li_2SiO_3$, and the like in which the ratio of the oxygen atom number to the silicon atom number is equal to or larger than 2, in the case of silicon lower oxides or lithium-containing compounds thereof $Li_xSiO_y$ (wherein $x \geq 0$, $2 > y > 0$) having a smaller ratio of the oxygen atom number, the amount capable of electrochemically absorbing and releasing lithium ion in the non-aqueous electrolyte, that is the charge and discharge capacity, is remarkably large, and the charge and discharge capacity in a base region in which the potential thereof is not more than 1.0 V with respect to lithium metal is remarkably large, and they are more suitable as the negative electrode active material. In particular, it has been found that the silicon lower oxides having an amorphous structure or lithium-containing compounds thereof have a large charge and discharge capacity, and suffer small deterioration due to repeated charge and discharge (cycle) and excessive charge and discharge, which are more suitable.

On the basis of these facts, more preferably, the present invention proposes the use of a novel material capable of absorbing and releasing lithium ion comprising silicon oxide containing lithium represented by a composition formula $Li_xSiO_y$ (wherein $x \geq 0$, $2 > y > 0$) as the negative electrode active material for such a battery. Namely, there is given the oxide having the composition in which the ratio y of the oxygen atom number to the silicon atom number is less than 2 and larger than 0, and the silicon lower oxide, which contains lithium in the crystal structure thereof, more preferably in the amorphous structure, and is capable of absorbing and releasing lithium ion by the electrochemical reaction in the non-aqueous electrolyte, is used. It is preferable that the state of lithium in the oxide be mainly ion, however, there is necessarily no limitation.

As preferable production methods for the silicon lower oxide containing lithium $Li_xSiO_y$ (wherein $x \geq 0$, $2 > y > 0$) to be used as the negative electrode active material for the battery of the present invention, the following two kinds of methods can be exemplified, however, there is no limitation thereto.

The first method is a method in which a silicon lower oxide $SiO_y$ (wherein $2 > y > 0$) containing no lithium is synthesized beforehand, and using an electrochemical reaction between the obtained silicon lower oxide $SiO_y$ and lithium or a material containing lithium, the silicon lower oxide $SiO_y$ is allowed to absorb lithium ion so as to obtain the silicon lower oxide containing lithium $Li_xSiO_y$. As such a silicon lower oxide $SiO_y$, those having stoichiometric compositions such as $SiO_{1.5}(Si_2O_3)$, $SiO_{1.33}(Si_3O_4)$, SiO and $SiO_{0.5}(Si_2O)$ and the like as well a those having optional compositions in which y is larger than 0 and less than 2 are available. In addition, these silicon lower oxides $SiO_y$ can be produced by various known methods as described as follows. Namely, there are (1) a method in which silicon dioxide $SiO_2$ is mixed with silicon Si in a predetermined mole ratio and heated in a non-oxidized atmosphere or in vacuum, (2) a method in which silicon dioxide $SiO_2$ is heated in a reducing gas such as hydrogen $H_2$ or the like and reduced by a predetermined amount, (3) a method in which silicon dioxide $SiO_2$ is mixed with a predetermined amount of carbon C, metal or the like, and heated and reduced by a predetermined amount, (4) silicon Si is heated with oxygen gas or oxide and oxidized by a predetermined amount, (5) a CVD method, a plasma CVD method and the like in which a mixed gas of a silicon compound gas such as silane $SiH_4$ or the like and oxygen $O_2$ is subjected to a heating reaction or a plasma decomposition reaction.

On the other hand, as the material containing lithium for using the electrochemical reaction, for example, it is possible to use an active material capable of absorbing and releasing lithium ion such as those used in the prior art for the positive electrode active material, the negative electrode active material and the like.

The incorporation of lithium ion by the electrochemical reaction into the silicon lower oxide $SiO_y$ can be performed inside the battery after assembling the battery, or inside the battery or outside the battery during battery production steps, which can be concretely performed as follows. Namely, (1) one in which the silicon lower oxide or a mixed agent of it and a conductive agent, a binding agent and the like is molded into a predetermined shape is used as one electrode (working electrode), metallic lithium or a material containing lithium is used as another electrode (counter electrode), and the both electrodes are opposed with contacting with a lithium ion-conductive non-aqueous electrolyte so as to constitute an electrochemical cell. Current application is performed with a suitable current in a direction to allow the working electrode to conduct the cathode reaction so as to electrochemically incorporate lithium ion into the silicon lower oxide. The resulting working electrode is used as a negative electrode as it is or as a negative electrode active material for constituting a negative electrode so as to constitute a non-aqueous electrolyte secondary battery. (2) The silicon lower oxide or a mixed agent of it and a conductive agent, a binding agent and the like is molded into a predetermined shape, to which lithium, a lithium alloy or the like is applied by pressure or contacted to make a laminated electrode which is used as a negative electrode to incorporate into a non-aqueous electrolyte secondary battery. There is given a method in which the laminated electrode contacts with the electrolyte inside the battery, thereby a kind of local cell is formed to perform self-discharge, and the lithium is electrochemically absorbed by the silicon lower oxide. (3) A non-aqueous electrolyte secondary battery is constituted in which the silicon lower oxide is used as a negative electrode active material, and the lithium-containing material capable of absorbing and releasing lithium ion is used as a positive electrode active material. There is given a method in which charging is performed during the use as a battery, thereby lithium ion released from the positive electrode is incorporated into the silicon lower oxide.

The second method is a method in which each simple substance of lithium and silicon or compounds thereof are mixed in a predetermined mole ratio, which are heated in a non-oxidized atmosphere or in an atmosphere in which oxygen is restricted to perform synthesis. Each of the compounds of lithium and silicon to serve as starting raw materials are preferable compounds which generate oxides by heating in the non-oxidized atmosphere such as each oxide, hydroxide, or salt such as carbonate, nitrate and the like, organic compounds and the like. In particular, a method, in which the silicon lower oxide $SiO_y$ shown in the above-mentioned first method is used as the silicon compound, and it is mixed with lithium or a compound of lithium having oxygen so as to heat in an inert atmosphere or in vacuum, is easy to control and easy to produce, which is preferable because one having excellent charge and discharge characteristics is obtained. In addition, it is also possible that these starting raw materials are dissolved or dispersed in a solvent such as water, alcohol, glycerol and the like, which are homogeneously mixed and/or reacted in the solution, and then dried to perform the above-mentioned heating treatment. In particular, according to a method in which silicon or the above-mentioned silicon lower oxide or a dispersed solution or an aqueous solution thereof is added to an aqueous solution of lithium hydroxide by a predetermined amount to mix, and the reacted material is dried and dehydrated followed by performing the above-mentioned heating treatment, there is such an advantage that a more homogeneous product is obtained by the heating treatment at a lower temperature. The heating temperature differs also depending on starting materials and a heating atmosphere, however, usually the synthesis is possible at not less than 400° C., while in the case of a temperature not less than 800° C., there is such a case in which silicon and silicon dioxide $SiO_2$ are generated by disproportionation reactions, so that a temperature of 400°–800° C. is preferable. In addition, when various silicic acids having hydrogen are used as the silicon compound as the starting raw material, and when lithium hydroxide or the like is used as the lithium compound, hydrogen is not completely released by the heating treatment, a part of which remains in a product after the heat treatment. It is also possible to allow lithium and hydrogen to exist together, which is included in the present invention. Further, together with lithium or the compound thereof and silicon or the compound thereof, small amounts of simple substances or compounds thereof or the like of other alkali metals such as sodium, potassium, rubidium and the like, alkaline-earth metals such as magnesium, calcium and the like and/or other metallic or non-metallic elements such as iron, nickel, manganese, vanadium, titanium, lead, aluminum, germanium, boron, phosphorus and the like are also added to mix and perform the heating treatment, thereby it is also possible to allow these metals or non-metals in small amounts other than lithium to exist together with lithium and silicon, and these cases are also included in the present invention.

With respect to the silicon lower oxide containing lithium obtained as described above, it can be used as the negative electrode active material as it is or after applying processing such as grinding and grading, granulation and the like, if necessary, or in the same manner as the above-mentioned first method, in accordance with an electrochemical reaction of the silicon lower oxide containing lithium and lithium or a material containing lithium, lithium ion is further incorporated into the silicon lower oxide containing lithium, or inversely lithium ion is released from the silicon lower oxide containing lithium, thereby a negative electrode active material in which the lithium amount is increased or decreased may be used.

The silicon lower oxide containing lithium $Li_xSiO_y$ obtained as described above is used as the negative electrode active material.

On the other hand, as the positive electrode active material, as described above, it is possible to use various materials capable of absorbing and releasing lithium ion and/or anion such as metal chalcogenide such as $TiS_2$, $MoS_2$, $NbSe_3$, and the like, metal oxide such as $MnO_2$, $MoO_3$, $V_2O_5$, $Li_xCoO_2$, $Li_xNiO_2$, $Li_xMn_2O_4$ and the like, conductive polymers such as polyaniline, polypyrrole, polyparaphenylene, polyacene and the like, graphite intercalation compounds and the like. The negative electrode, which uses the silicon oxide containing lithium of the present invention, especially the lower oxide $Li_x SiO_y$ as the negative electrode active material, has such advantages that the electrode potential with respect to metallic lithium is low (base), and the charge and discharge capacity in a base region of not more than 1 V is considerably large, so that by combining with the positive electrode using the (noble) active material having an electrode potential with respect to metallic lithium of not less than 2 V such as the above-mentioned metal oxide, metal chalcogenide and the like, preferably a high potential of not less than 3 V or 4 V such as $V_2O_5$, $MnO_2$, $Li_xCoO_2$, $Li_xNiO_2$, $Li_xMn_2O_4$ and the like, there is given such an advantage that a secondary battery having a higher voltage and a higher energy density in which the charge and discharge characteristics are excellent is obtained.

In particular, in the case of the use of combination of the negative electrode using the negative electrode active material comprising the silicon oxide or the silicate containing lithium according to the present invention and a positive electrode using a positive electrode active material comprising a layer-like structure composite oxide containing lithium represented by a composition formula of $Li_aM_bL_cO_2$ wherein M is a transition metal element, L is one or more species of metalloid elements selected from boron B and silicon Si, and a, b and c reside in $0<a<1.15$, $0.85<b+c<1.3$ and $0<c$ respectively, a secondary battery especially having a high energy density in which the charge and discharge characteristics are excellent, the deterioration due to excessive charge and excessive discharge is small, and the cycle life is long is obtained, which is especially preferable.

The composite oxide $Li_aM_bL_cO_2$ used as the positive electrode active material of the battery of the present invention can be synthesized as follows. Namely, it is obtained by mixing each simple substance or each oxide, hydroxide or salt such as carbonate, nitrate or the like of lithium Li, the transition metal M and the element L in a predetermined ratio, and heating and calcining in air or in an atmosphere containing oxygen at a temperature of not less than 600° C., preferably a temperature of 700°–900° C. As supply sources of Li, M, L and the like, when oxides or compounds containing oxygen thereof are used, it is also possible to heat and synthesize in an inert atmosphere. The heating time is usually sufficient for 4–50 hours, however, in order to facilitate the synthesis reaction and enhance the homogeneity, it is effective to repeat the process of calcining, cooling, grinding and mixing several times.

With respect to the composition formula $Li_aM_bL_cO_2$, the Li amount a has standard $a=1$ of the constant ratio composition in the above-mentioned heating synthesis, however, an inconstant ratio composition of a degree of ±15% is also possible, and in accordance with electrochemical intercalation, deintercalation and the like, $0<a≦1.15$ is possible. Co, Ni, Fe, Mn, Cr, V and the like are preferable as the transition metal M, and in particular Co and Ni have excellent charge and discharge characteristics, which are preferable. With respect to the boron and/or silicon amount c and the transition metal M amount b, in the case of $0<c$ and $0.85<b+c≦1.3$, the effects on the reduction in polarization (internal resistance) during charge and discharge, the improvement in cycle characteristics and the like are remarkable, which is preferable. On the other hand, the charge and discharge capacity per every cycle inversely lowers if the boron and/or silicon amount c is too large, and it becomes maximum in the case of $0<c≦0.5$, so that this range is especially preferable.

In addition, as the electrolyte, it is possible to use a lithium ion-conductive non-aqueous electrolyte such as a non-aqueous (organic) electrolyte solution in which a lithium ion dissociating salt such as $LiClO_4$, $LiPF_6$, $LiBF_4$, $LiCF_3SO_3$, or the like as a supporting electrolyte is dissolved in an organic solvent alone or a mixed solvent such as γ-butyrolactone, propylene carbonate, ethylene carbonate, butylene carbonate, dimethyl carbonate, diethyl carbonate, methyl formate, 1,2-dimethoxyethane, tetrahydrofuran, dioxolan, dimethylformamide or the like, a macromolecular solid electrolyte in which the above-mentioned lithium salt is allowed to make a solid solution in a macromolecule such as polyethylene oxide, polyphosphagen cross-linked substance or the like, and an inorganic solid electrolyte such as $Li_3N$, LiI or the like.

However, it has been found that when the non-aqueous electrolyte secondary battery is produced using the silicon oxide containing lithium, especially the silicon lower oxide $Li_xSiO_y$ according to the present invention as the negative electrode active material, and using the non-aqueous electrolyte solution as described above, the difference between the charge capacity and the discharge capacity, that is the capacity loss, considerably differs depending on the type of the non-electrolyte solution to be used, and the charge and discharge efficiency considerably differs, so that the discharge capacity decreases due to repeated charge and discharge, and hence the cycle life considerably differs. The major cause thereof, which will be explained in detail in embodiment as described hereinafter, has been revealed to be due to the fact that the non-aqueous electrolyte solution decomposes to generate gas during charging at the negative electrode using the silicon oxide containing lithium, especially the silicon lower oxide $Li_xSiO_y$ as the active material, the non-aqueous electrolyte solution is deteriorates, and the internal resistance increases. The generation of gas due to the decomposition of the electrolyte solution increases the internal pressure of the battery, which inflates the battery in excessive cases and may lead to an explosion, which is an important problem also from a viewpoint of safety. The practical use of such a battery carried on an electronic instrument or the like may result in breakage of the electronic instrument.

Generally, the non-aqueous electrolyte solution is also oxidized and reduced by electrochemical reactions when a high potential or a low potential outside a stable region is applied. This decomposes and deteriorates the electrolyte solution, which may result in deterioration of the battery and the decrease in the charge and discharge cycle life in the case of the use as the battery.

Especially when the silicon lower oxide containing lithium represented by $Li_xSiO_y$ ($0 \leq x$, $0 < y < 2$) of the present invention is used as the negative electrode active material, rather than the deterioration of the active material itself due to the repeated charge and discharge, the increase in the internal resistance of the battery due to accumulation of gas generated by the deterioration and decomposition of the non-aqueous electrolyte solution or the like causes the performance deterioration of the battery. In addition, the above-mentioned capacity loss is also large, and it is impossible to sufficiently utilize the high charge and discharge capacity characteristics possessed by the active material.

In order to solve the problems as described above, the present invention further proposes the use of a non-aqueous electrolyte solution containing ethylene carbonate (EC) in the secondary battery using the silicon oxide containing lithium, especially the lower oxide represented by $Li_xSiO_y$ ($0 \leq x$, $0 < y < 2$) as the negative electrode active material. Since EC has a high freezing point, it is desirable that it is not more than 80% by volume ratio with respect to the total solvent of the electrolyte. In addition, EC is a high viscosity solvent, so that in order to further raise the ion conductivity and further stabilize, it is desirable that an R.R' type alkyl carbonate (including R=R') represented by the formula 1 is also contained. R and R' are alkyl groups indicated by $C_nH_{2n+1}$ in which in the case of n=1, 2, 3, 4 and 5, the ion conductivity is especially high and the viscosity is low, which is preferable. Among them, dimethyl carbonate (DMC), diethyl carbonate (DEC), methyl ethyl carbonate and the like are more preferable in which R and R' in the formula 1 are methyl group (n=1) or ethyl group (n=2). Further, it is desirable that the solvent of the electrolyte solution is constituted by EC and the R.R' type alkyl carbonate represented by the formula 1, and the ion electric conductivity becomes maximum when the mixing ratio of EC to the R.R' type alkyl carbonate is about 1:1 in volume ratio, so that it is especially preferable that the mixing ratio is 3:1 to 1:3 in volume ratio.

In addition, as the supporting electrolyte in the electrolyte solution, as described above, salts which dissociate $Li^+$ ion in the solvent and do not directly react with the negative electrode and the positive electrode are available, however, for example, $LiClO_4$, $LiPF_6$, $LiBF_4$, $LiCF_3SO_3$, $Li(CF_3SO_2)_2N$ and the like are suitable.

The negative electrode which uses the silicon oxide or the silicate containing lithium of the present invention as the negative electrode active material can stably and repeatedly absorb and release lithium ion in a range of the electrode potential of at least 0–3 V with respect to metallic lithium in the non-aqueous electrolyte, and can be used as the negative electrode of the secondary battery capable of repeated charge and discharge according to such an electrode reaction. Especially in a base electric potential region of 0–1 V with respect to the lithium reference electrode (metallic lithium), there is given a charge and discharge region of a high capacity in which lithium ion can be stably absorbed and released, and it is possible to perform repeated charge and discharge. In addition, as compared with carbonaceous materials such as graphite and the like which have been hitherto used as a negative electrode active material of such a battery, the amount capable of reversibly absorbing and releasing lithium ion, that is the effective charge and discharge capacity, is considerably large, and the polarization of charge and discharge is small, so that it is possible to perform charge and discharge with a large current. Little deterioration such as generation of irreversible substances and the like is observed due to excessive charge and excessive discharge, wherein the extremely stable secondary battery having a long cycle life can be obtained.

Especially when the silicon lower oxide $Li_xSiO_y$ (wherein $x \geq 0$, $2 > y > 0$) having the composition in which the ratio y of the oxygen atom number to the silicon atom number is less than 2 is used, as compared with a case in which a silicon oxide or a silicate or the like in which the ratio y of the oxygen atom number to the silicon atom number is not less than 2 is used, it is possible to obtain the secondary battery in which the amount capable of reversibly absorbing and releasing lithium ion that is the effective charge and discharge capacity is considerably large, and especially the charge and discharge characteristics are excellent.

Further, with respect to the negative electrode active material comprising the silicon oxide or the silicate containing lithium according to the present invention, the battery reaction velocity by the absorbing and releasing reactions of lithium ion at a temperature not more than the melting point of lithium metal (about 180° C.) is sufficiently large, so that it is especially suitable for the non-aqueous electrolyte secondary battery of the room temperature or ordinary temperature working type.

The reason why such excellent charge and discharge characteristics are obtained is not necessarily clarified, however, it is presumed as follows. Namely, it is presumed to be due to the fact that in the silicon oxide or the silicate containing lithium as the novel negative electrode active material according to the present invention, silicon atoms and oxygen atoms having strong covalently bonding properties form a chain structure, a layered structure, a three-dimensional network structure or the like in which a backbone structure is formed by connecting a basic structure in which oxygen atom are coordinated using a silicon atom as the center. The mobility of lithium ion in such a structure is high, and there are many sites which can incorporate lithium ion such that the absorption and release of lithium ion is facilitated.

In addition, it is presumed to be due to the fact that in the case of the silicon oxide or the silicate having the ratio y of the oxygen atom number to the silicon atom number of not less than 2, there is given such a backbone structure that tetrahedrons in which a silicon atom is bonded to four oxygen atoms are connected. On the contrary, in the case of $Li_xSi$ in which y is zero, there is given a backbone structure composed of only bonds between silicons with each other, whereas in the case of the silicon lower oxide containing lithium $Li_xSiO_y$ (wherein $x > 0$, $2 > y > 0$), a backbone structure is formed which has bonds between silicon atoms with each other as well as bonds between silicon atoms and oxygen atoms. The mobility of lithium ion in such a structure is high, and there are many sites which can incorporate lithium ion, so that the absorption and release of lithium ion is facilitated.

On the other hand, the composite oxide $Li_aM_bL_cO_2$ which is used as the positive electrode active material has the electrode potential with respect to metallic lithium of a high potential of about 4 V or more, in which reversible charge and discharge is possible at least between $0 < a \leq 1.15$. As a result of the intercalation and deintercalation of Li ion, the deterioration due to excessive charge and excessive discharge is small, and excellent cycle characteristics are provided. Especially when there is given $0.05 \leq c < 0.5$ for the B and/or Si content c, the polarization is small, and the cycle characteristics are excellent. The reason why such excellent charge and discharge characteristics are obtained is not necessarily clarified, however, it is postulated as follows. Namely, the positive electrode active material $Li_aM_bL_c$ according to the present invention has a backbone structure similar to that of the $\alpha$-NaCrO$_2$ type in which a part of a transition metal element M of an oxide $Li_aM_bO_2$ of a layered structure of the $\alpha$-NaCrO$_2$ type containing neither B nor Si is substituted by B or Si. However, the B atom and the Si atom can also exist between gaps between lattices of the crystal and Li sites (substituted with Li). In any case, it is postulated to be due to the fact that owing to the existence of B or Si, the crystal structure and the electron state change, so that the Li ion conductivity is enhanced, and the absorption and release of lithium ion is facilitated.

Thus, the battery in which the negative electrode active material and the positive electrode active material according to the present invention are combined and used has a high working voltage of about 4 V in which the amount capable of reversibly absorbing and releasing lithium ion, that is the charge and discharge capacity, is considerably large, and the polarization of charge and discharge is small, so that it has especially excellent performance such that it is possible to perform charge and discharge with a large current. Further the deterioration such as decomposition of the active material due to excessive charge and excessive discharge, decay of crystals and the like is scarecely observed, it is extremely stable and has a long cycle life and the like.

In addition, in the non-aqueous electrolyte secondary battery of the present invention in which the silicon oxide containing lithium is used as the negative electrode active material, the non-aqueous electrolyte solution containing EC and the R. R' type alkyl carbonate represented by the formula 1 are used as the electrolyte, thereby it is possible to considerably suppress the deterioration due to decomposition of the electrolyte solution and generation of gas during charge and discharge. Namely, in the prior art, when the non-aqueous electrolyte solution, which has been most generally used for such a non-aqueous electrolyte secondary battery in which LiClO$_4$, LiPF$_6$ or the like is dissolved in PC as the supporting electrolyte, is used for the battery in which the above-mentioned silicon oxide containing lithium, especially the silicon lower oxide $Li_x\,SiO_y$ ($0<y<2$) is used as the negative electrode active material, then gas is vigorously generated during charge due to decomposition of the electrolyte solution, and the decrease in the discharge capacity is considerable due to repeated charge and discharge. On the other hand when the electrolyte solution containing EC, especially the electrolyte solution in which LiClO$_4$, LiPF$_6$ or the like is dissolved in a mixed solvent of EC and DEC or DMC as the supporting electrolyte is used, then neither decomposition of the electrolyte solution nor generation of gas takes place. Thereby, the capacity loss during charge and discharge is considerably reduced, the charge and discharge efficiency is considerably improved, and it is possible to obtain the battery having a high voltage and high energy in which the cycle life is long and the reliability is high in which the high capacity density inherent in the active materials of the negative electrode and the positive electrode is well utilized.

DETAILED DESCRIPTION OF THE PREFERRED EMBODIMENTS

The present invention will be further explained in detail hereinafter in accordance with Examples.

[EMBODIMENT]

Figure 1:
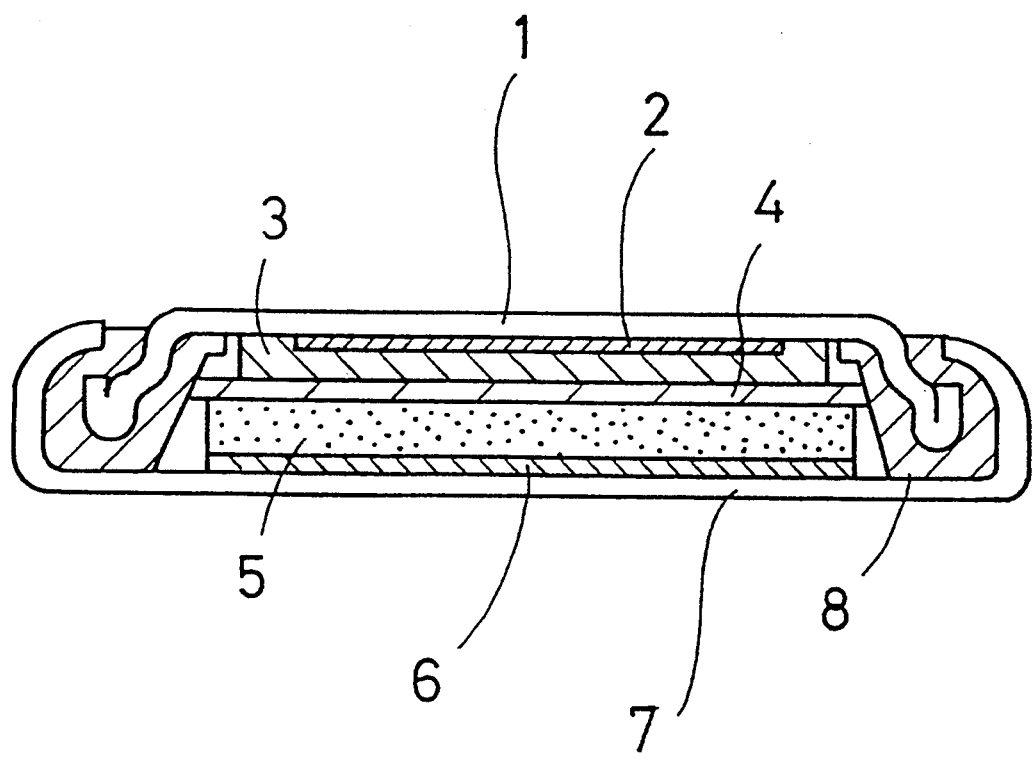
FIG. 1 is an explanatory view showing one example of the structure of the battery used for comparison and evaluation of the negative electrode active material in the present invention.

FIG. 1 is a cross-sectional view of a coin type battery showing one example of a test cell used for evaluation of performance of negative electrode active materials of non-aqueous electrolyte secondary batteries according to the present invention in the following Examples. In the FIG., 1 is a counter electrode case which also serves as a counter electrode terminal, in which a plate made of stainless steel having one outside face subjected to Ni plating has been subjected to drawing processing. 2 is a counter electrode collector composed of a net made of stainless steel, which is spot-welded to the counter electrode case 1. A counter electrode 3 is fabricated from an aluminum plate having a predetermined thickness which is punched to have a diameter of 15 mm and secured onto the counter electrode collector 2, onto which one obtained by a lithium foil having a predetermined thickness and punched into a diameter of 14 mm is applied by pressure. 7 is a working electrode case made of stainless steel having one outside face subjected to Ni plating, which also serves as a working electrode terminal. 5 is a working electrode constituted using an active material according to the present invention or a comparative active material according to the conventional method as described hereinafter. 6 is a working electrode collector composed of a net made of stainless steel or a conductive adhesive using carbon as a conductive filler, which electrically connects the working electrode 5 with the working electrode case 7. 4 is a separator composed of a porous film of polypropylene in which an electrolyte solution is impregnated. 8 is a gasket mainly composed of polypropylene which intervenes between the counter electrode case 1 and the working electrode case 7, maintains the electric insulation between the counter electrode and the working electrode, and simultaneously tightly encloses and seals the battery contents by inwardly folding an opening edge of the working electrode case to be caulked. Preferably, the size of the battery is 20 mm in outer diameter and 1.6 mm in thickness.

(Example 1)

A working electrode 5 of the present Example was manufactured as follows. Commercially available lithium metasilicate $Li_2SiO_3$ was ground and graded with an automatic mortar to have a particle size of not more than 53 $\mu$m to provide an active material a according to the present invention to which were mixed graphite as a conductive agent, a cross-linked type acrylic acid resin and the like as a binding agent in a ratio of a weight ratio of 30:65:5 to provide a working electrode mixed agent, and then the working electrode mixed agent was pressurized and molded under 2 ton/cm$^2$ into a pellet having a diameter of 15 mm and a thickness of 0.5 mm together with a working electrode collector 6 composed of a net made of stainless steel, followed by heating and drying under a reduced pressure at 200° C. for 10 hours to provide the working electrode.

In addition, for comparison, a similar electrode (working electrode for comparison) was prepared in the same manner as the case of the above-mentioned working electrode of the present invention except that instead of the above-mentioned active material a according to the present invention, the same graphite as one used for the above-mentioned conductive agent was used as an active material (abbreviated as the active material r).

As an electrolyte solution was used one in which lithium perchlorate $LiClO_4$ was dissolved by 1 mol/l in a mixed solvent of a volume ratio of 1:1 of propylene carbonate and 1,2-dimethoxyethane.

A battery manufactured in such a manner was left at room temperature for 1 week to perform aging, followed by performing a charge and discharge test as described hereinafter. Owing to the aging, sufficient alloy formation proceeded for the lithium-aluminum laminated electrode as the counter electrode by the contact with the non-aqueous electrolyte solution in the battery, and substantially all lithium foil was converted into an Li—Al alloy, so that the cell voltage became a value lower by about 0.4 V than that of a case in which metallic lithium was used alone as the counter electrode, which was stabilized.

The batteries manufactured as described above are abbreviated hereinafter as the batteries A and R, corresponding respectively to each of the active materials a and r of the working electrodes used.

Figure 2:
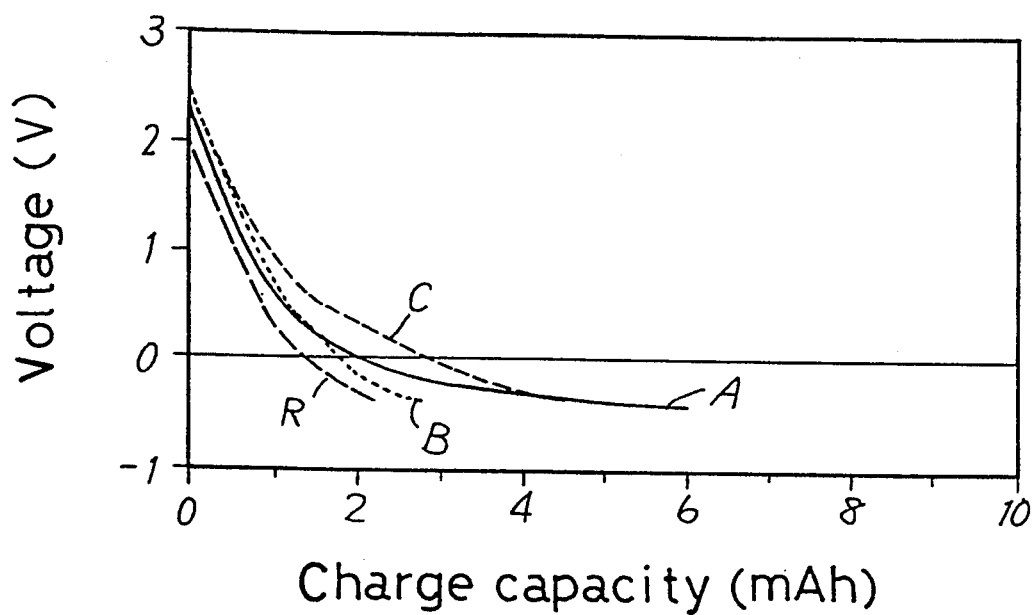
FIG. 2 is an explanatory view showing comparison of charge characteristics in the third cycle for negative electrode active materials of the battery according to the present invention and a conventional battery.
Figure 3:
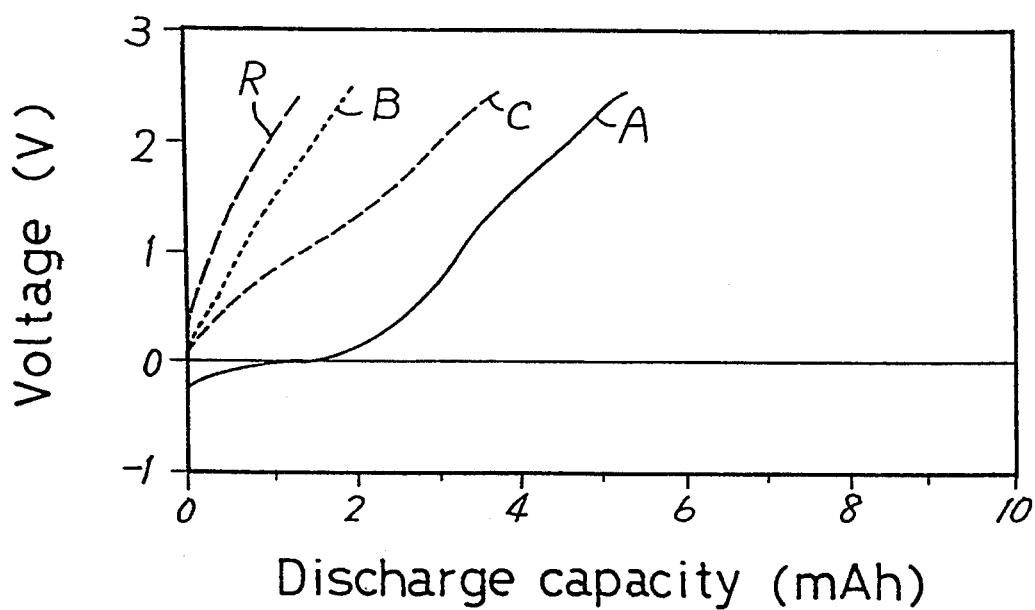
FIG. 3 is an explanatory view showing comparison of discharge characteristics in the third cycle for negative electrode active materials of the battery according to the present invention and the conventional battery.
Figure 4:
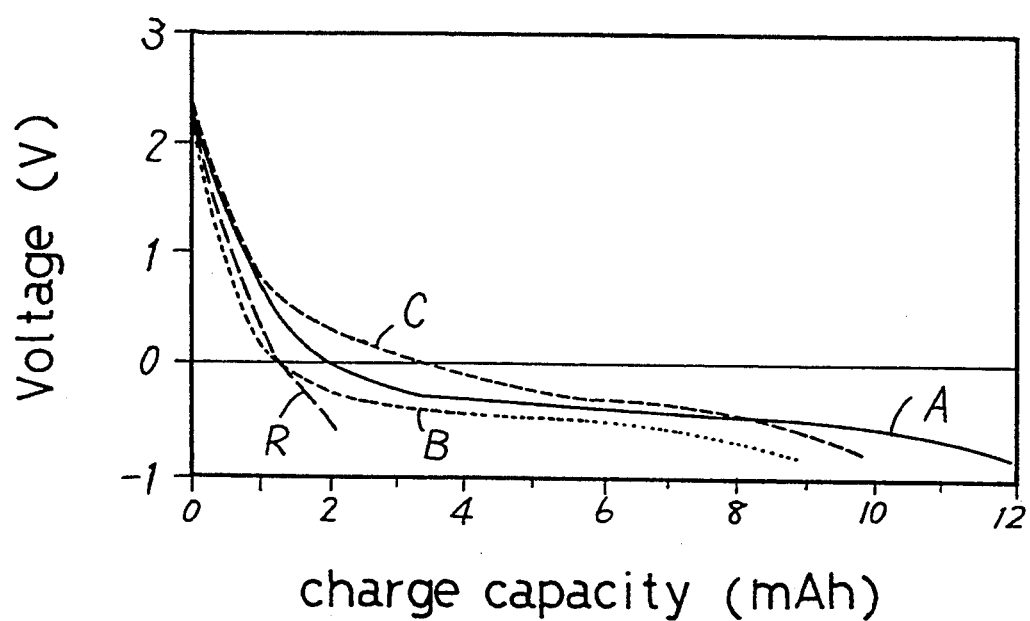
FIG. 4 is an explanatory view showing comparison of charge characteristics in the third cycle for negative electrode active materials of the battery according to the present invention and a conventional battery.
Figure 5:
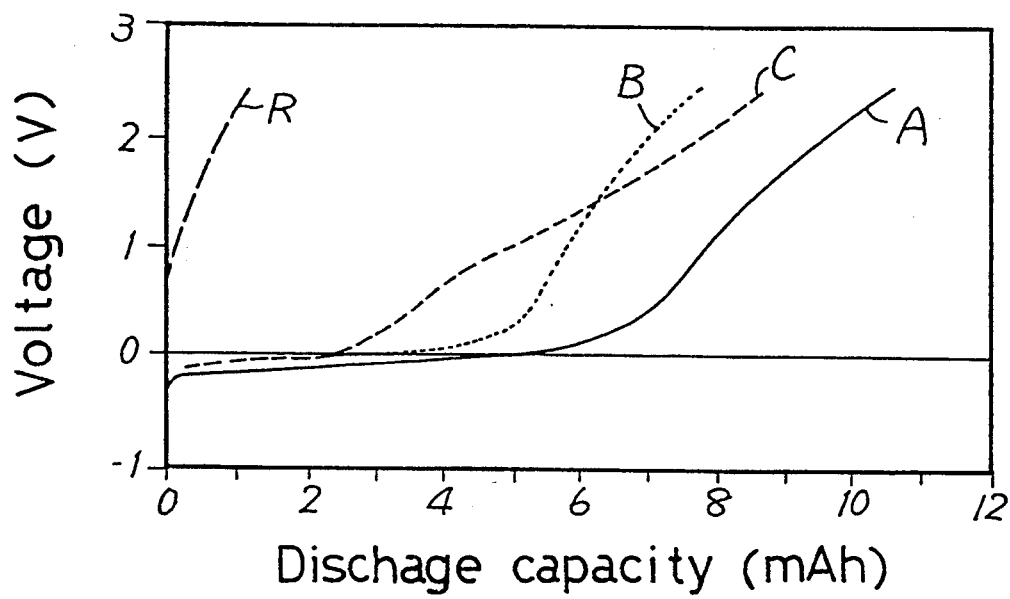
FIG. 5 is an explanatory view showing comparison of discharge characteristics in the third cycle for negative electrode active materials of the battery according to the present invention and a conventional battery.
Figure 6:
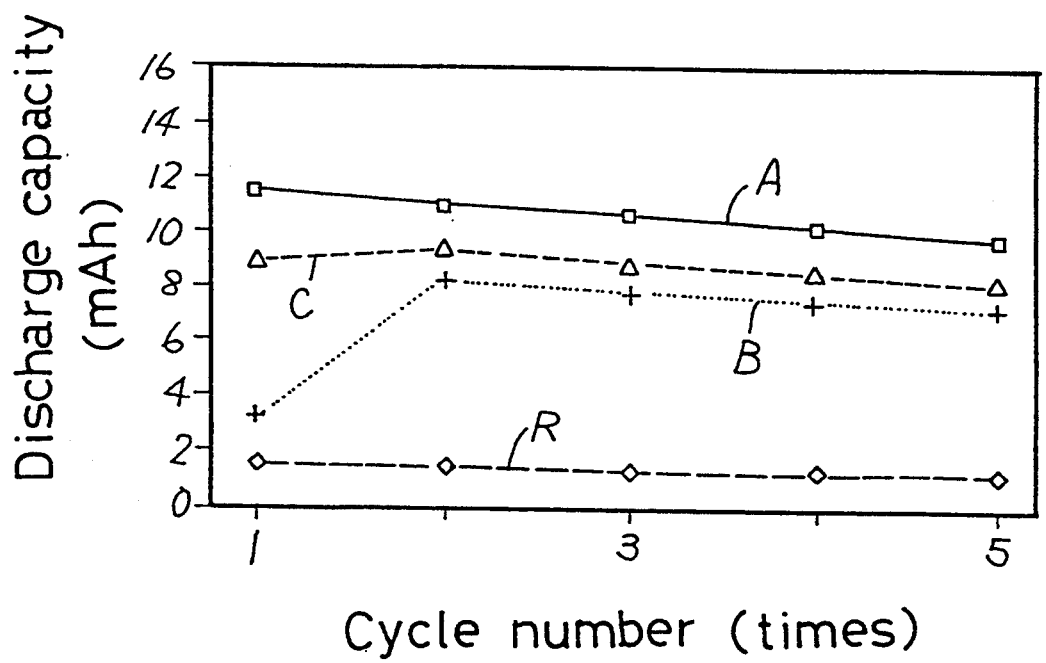
FIG. 6 is an explanatory view showing comparison of cycle characteristics for negative electrode active materials of the battery according to the present invention and a conventional battery.

For these batteries A and R, there are shown a charge characteristic in FIG. 2 and a discharge characteristic in FIG. 3 in the third cycle when charge and discharge cycles were made with a constant current of 0.4 mA under conditions of an end voltage of charge (in a current direction to perform a battery reaction to absorb lithium ion into the working electrode from the electrolyte solution) of −0.4 V and an end voltage of discharge (in a current direction to perform a battery reaction to release lithium ion into the electrolyte solution from the working electrode) of 2.5 V. In addition, there are shown a charge characteristic in the third cycle in FIG. 4, a discharge characteristic in the third cycle in FIG. 5 and cycle characteristics in FIG. 6 when charge and discharge cycles were made with the same constant current under conditions of an end voltage of charge of −0.8 V and an end voltage of discharge of 2.5 V. Incidentally, the charge and discharge cycles started by charge. In addition, when the batteries in the charged state and the discharged state were disassembled after these charge and discharge cycles and observed with a microscope, no deposition of lithium metal was observed on the working electrode, and it was confirmed that the charge and discharge reactions of the working electrode were substantially due to the reactions of the active material.

As clarified from FIGS. 2–6, it is understood that with respect to the battery A according to the present invention, the charge and discharge capacity is considerably large, and the reversible region of charge and discharge is considerably enlarged as compared with the comparative battery R. In addition, it is understood that the difference in working voltages of charge and discharge becomes considerably small over the entire charge and discharge region, the polarization (internal resistance) of the battery is considerably small, and it is easy to perform charge and discharge with a large current. Further, the decrease in the discharge capacity (cycle deterioration) due to repeated charge and discharge is considerably small. This is presumed to be due to the fact that as described above, in the case of the silicon oxide or the silicate containing lithium as the active material of the working electrode of the battery A according to the present invention, a backbone structure is provided in which four oxygen atoms are bonded with a silicon atom as the center in a tetrahedron configuration, the mobility of lithium ion in this structure is high, and there are extremely many sites capable of absorbing lithium ion, so that the absorption and release of lithium ion is facilitated.

(Example 2)

Instead of the active material a in Example 1, commercially available guaranteed reagent grade silicon dioxide $SiO_2$ (precipitated anhydrous silicic acid) was ground and graded to have a particle size of not more than 53 mm to be used as an active material (abbreviated as the active material b) of the working electrode. The active material b, the same graphite as used in Example 1 as the conductive agent, and the same cross-linked type acrylic acid resin and the like as used in Example 1 as the binding agent, were mixed in weight ratio of 30:65:5 to provide a working electrode mixed agent. The working electrode mixed agent was then pressurized and molded under 2 ton/cm$^2$ into a pellet having a diameter of 15 mm and a thickness of 0.5 mm together with a working electrode collector 6 comprising of a net made of stainless steel. The working electrode mixed agent was then heated and dried under a reduced pressure at 200° C. for 10 hours to provide the working electrode. A similar battery B was manufactured in exactly the same manner as Example 1 except that the working electrode manufactured as described above was used.

Also for the battery B obtained as described above, the charge and discharge cycle test was performed in the same manner as Example 1. Results in this case have been shown in FIGS. 2–6 together in the same manner as Example 1.

As clarified from the figures, it is understood that the battery B of the present Example has excellent charge and discharge characteristics in the same manner as the battery A according to the present invention in Example 1. Namely, lithium ion is released during the charge cycle from the Li—Al alloy of the counter electrode into the electrolyte solution. The lithium ion then moves in the electrolyte solution and performs an electrode reaction with the active material. The lithium ion is then electrochemically absorbed into the active material b, and the silicon oxide containing lithium is generated. Next, during discharge, lithium ion is released from the oxide into the electrolyte solution, which moves in the electrolyte solution and is absorbed into the Li—Al alloy of the counter electrode, thereby making it possible to repeatedly perform charge and discharge in a stable manner. In this case, after the generation of the silicon oxide containing lithium by the first charge, the active material b forms the silicon oxide containing lithium except for the case of complete discharge in the following discharge and charge cycles.

(Example 3)

The present Example resides in a case in which an active material (abbreviated as the active material c) synthesized as described below was used instead of the active material a in Example 1, wherein a similar battery C was manufactured in exactly the same manner as Example 1 except for the active material of the working electrode.

The active material c of the present Example was synthesized as follows. Lithium hydroxide $LiOH \cdot H_2O$, silicon dioxide $SiO_2$ and vanadium pentaoxide $V_2O_5$ were sufficiently mixed with a mortar in a mole ratio of Li:Si:V = 2:0.9:0.1, and then the mixture was heated and treated in atmospheric air at a temperature of 1000° C. for 12 hours. After cooling, the obtained product was ground and graded to have a particle size of not more than 53 μm to use the active material c of the present Example.

Also for a battery C obtained in such a manner, the charge and discharge test was performed in the same manner as Example 1. Results in this case have been shown in FIGS. 2–6 together in the same manner as Examples 1 and 2.

As clarified from the figures, it is understood that the battery C of the present Example has excellent charge and discharge characteristics in the same manner as the batteries A and B according to the present invention described in Examples 1 and 2.

In addition, due to the fact that the active materials a, b and c of the batteries A, B and C, respectively, according to the present invention have considerably large charge and discharge capacities in a base potential region of −0.4 to 0.6 V with respect to the Li—Al alloy electrode as the counter electrode (corresponding to about 0–1 V with respect to metallic lithium), it is understood that they are suitable as the negative electrode active material for the non-aqueous secondary battery. Particularly the active material a in Example 1 in which the metasilicate is used as the starting material has a larger charge and discharge capacity in the base potential region and has a baser potential, which is especially suitable as the negative electrode active material.

(Example 4)

A working electrode 5 was manufactured as follows. Silicon oxide or silicon Si represented by a composition formula $SiO_y$ (wherein $0 \leq y$) was ground and graded with an automatic mortar to a particle size of not more than 53 μm to be used as the active material of the working electrode. The active material was then mixed with the same graphite as the one used in Example 1 as the conductive agent and with the cross-linked type acrylic acid resin and the like as the binding agent in a weight ratio of 65:20:15 to provide a working electrode mixed agent. Next, the working electrode mixed agent was pressurized and molded under 2 ton/cm$^2$ into a pellet having a diameter of 15 mm and a thickness of 0.3 mm to manufacture the working electrode 5. Thereafter, the working electrode 5 thus obtained was adhered to and integrated with a working electrode case 7 using a working electrode collector 6 composed of a conductive resin adhesive using carbon as a conductive filler. Finally, the working electrode was heated and dried under a reduced pressure at 200° C. for 10 hours, to manufacture the above-mentioned coin-shaped battery.

As the active material for the working electrode, the following three species of those in which the ratio y of the oxygen atom number to the silicon atom number in the above-mentioned composition formula $SiO_y$ was 2-0 were used to perform a comparison. Namely, there were given three species of (b1) silicon dioxide $SiO_2$ corresponding to y=2 (the same commercially available guaranteed grade precipitated anhydrous silicic acid as one used in Example 1, amorphous structure), (d1) silicon monoxide SiO corresponding to y=1 (commercially available guaranteed grade, amorphous structure), and (e) simple substance silicon Si corresponding to y=0 (commercially available guaranteed grade).

The electrolyte solution used was lithium perchlorate $LiClO_4$ dissolved by 1 mol/1 in a mixed solvent of a volume ratio of 1:1:2 of propylene carbonate, ethylene carbonate and 1,2-dimethoxyethane.

A battery manufactured in such a manner was left at room temperature for 1 week to perform aging, followed by performing a charge and discharge test as described hereinafter. Owing to the aging, sufficient alloy formation proceeded for the lithium-aluminum laminated electrode, as the counter electrode, by the contact with its non-aqueous electrolyte solution in the battery. Substantially all of the lithium foil was converted into an Li—Al alloy, so that the cell voltage became a value lower by about 0.4 V than that of a case in which metallic lithium was used alone as the counter electrode, which was stabilized.

The batteries manufactured as described above are abbreviated hereinafter as the batteries B1, D1 and E corresponding to each of the active materials b1, d1 and e of the working electrodes used.

Figure 7:
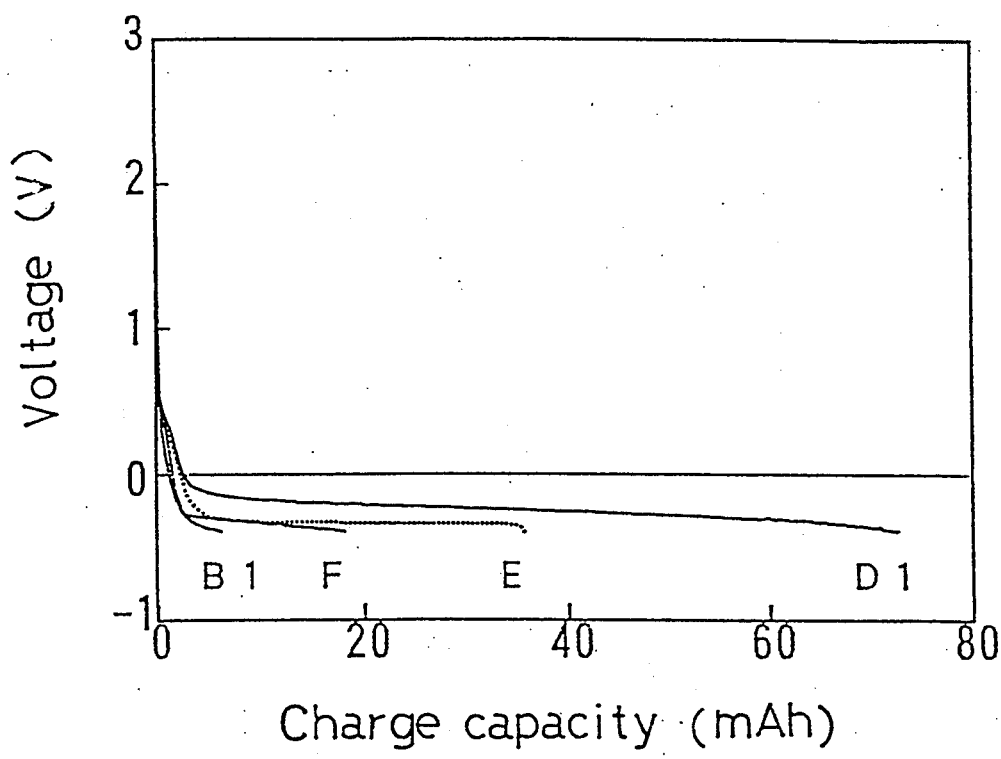
FIG. 7 is an explanatory view showing comparison of charge characteristics in the first cycle for various negative electrode active materials of the battery according to the present invention.
Figure 8:
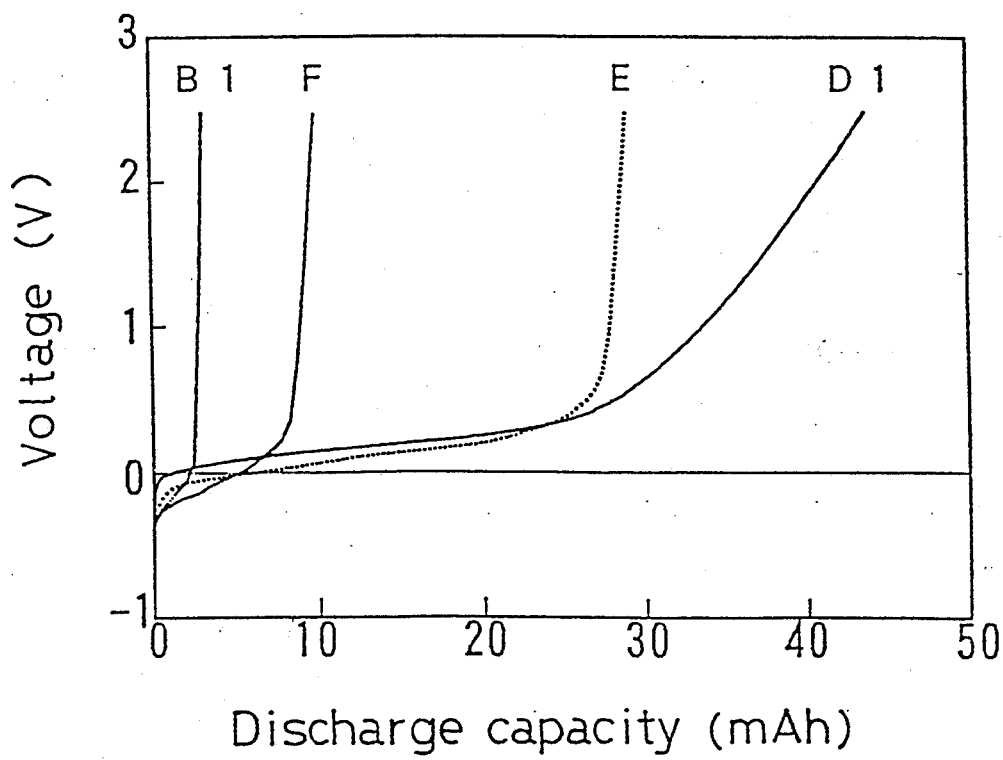
FIG. 8 is an explanatory view showing comparison of discharge characteristics in the first cycle for various negative electrode active materials of the battery according to the present invention.

For these batteries B1, D1 and E, there are shown charge characteristics in FIG. 7 and discharge characteristics in FIG. 8 in the first cycle when charge and discharge cycles were made with a constant current of 1 mA under conditions of an end voltage of charge (in a current direction to perform a battery reaction to absorb lithium ion into the working electrode from the electrolyte solution) of −0.4 V and an end voltage of discharge (in a current direction to perform a battery reaction to release lithium ion into the electrolyte solution from the working electrode) of 2.5 V. Incidentally, the charge and discharge cycles started by charge.

As clarified from FIG. 7 and FIG. 8, it is understood with respect to the battery using the working electrode using the silicon oxide represented by the composition formula $SiO_y$ as the active material, as compared with the battery B1 and the battery E in which the ratio y of the oxygen atom number to the silicon atom number corresponds to 2 and 0, that the charge and discharge capacity of the battery D1 having an intermediate value $0<y<2$ as y is considerably large, and the reversible region of charge and discharge is considerably enlarged. In addition, it is understood that the difference in working voltages of charge and discharge becomes considerably small over the entire charge and discharge region, the polarization (internal resistance) of the battery is considerably small, and it is easy to perform charge and discharge with a large current. Particularly, due to the fact that the charge and discharge capacity is considerably large in a base potential region such as −0.4 to +0.6 V with respect to the Li—Al alloy electrode as the counter electrode (corresponding to about 0–1 V with respect to metallic lithium), it is understood that it is especially suitable as the negative electrode active material of the non-aqueous electrolyte secondary battery.

Namely, lithium ion is released during the charge cycle from the Li—Al alloy of the counter electrode into the electrolyte solution. The lithium ion then moves in the electrolyte solution and performs an electrode reaction with the active material $SiO_y$ of the working electrode. The lithium ion is the electrochemically absorbed into the active material SiOy, and the silicon oxide containing lithium $Li_xSiO_y$ is generated. Next, during discharge, lithium ion is released from the oxide $Li_xSiO_y$ into the electrolyte solution, which moves in the electrolyte solution and is absorbed into the Li—Al alloy of the counter electrode. As a result, it is possible to repeatedly perform charge and discharge in a stable manner. In this case, after the generation of the silicon oxide containing lithium $Li_xSiO_y$ by the first charge, the active material SiO, forms the silicon oxide containing lithium $Li_xSiO_y$ except for the case of complete discharge in the following discharge and charge cycles. With respect to such a silicon oxide containing lithium $Li_xSiO_y$ it is understood that the charge and discharge characteristics are particularly suitable in the case of the lower oxide in which the ratio y of the oxygen atom number to the silicon atom number of the oxide $SiO_y$ in the state of complete release of lithium (completely discharged state) has an intermediate value $0<y<2$ between the silicon dioxide $SiO_2$ and silicon simple substance Si. In addition, it is understood that one having the amorphous structure shows excellent charge and discharge characteristics.

The above result is presumed to be due to the fact that, as described above, in the case of the silicon lower oxide $SiO_y$ having the value of $0<y<2$ of the ratio y of the oxygen atom number to the silicon atom number, in addition to the bonds between silicon atoms and oxygen atoms, there is also formed a backbone structure having bonds between silicons, the stable amorphous structure is easy to be formed, the mobility of lithium ion in such a structure is high, and there are extremely many sites capable of absorbing lithium ion, so that the absorption and release of lithium ion is facilitated.

(Example 5)

The present Example resides in a case in which an active material synthesized as follows (abbreviated as the active material f) was used instead of the active material of the working electrode in Example 4, wherein a similar battery F was manufactured in exactly the same manner as Example 4 except for the active material of the working electrode.

The active material of the present Example was synthesized as follows. Lithium hydroxide LiOH $H_2O$ and the same silicon monoxide SiO as one used in Example 4 were sufficiently mixed with a mortar in a mole ratio of Li: Si=1:1. Thereafter the mixture was heated and treated in a nitrogen gas flow at a temperature of 700° C. for 12 hours. After cooling, the obtained product was ground and graded to have a particle size of not more than 53 μm to be use as the active material f of the present Example. The active material f thus obtained had an average composition of LiSiO1.5 and a ratio of y of the oxygen atom number to the silicon atom number of 1.5, which was a silicon lower oxide containing lithium in the structure beforehand.

Moreover for a battery F obtained in such a manner, the charge and discharge test was performed in the same manner as in Example 4. Results for this case are shown in FIGS. 7-8 together in the same manner as for Example 4.

As clarified from the figures, the battery F of the present Example has a large charge and discharge capacity and excellent charge and discharge characteristics as compared with the battery B in which the silicon oxide $SiO_2$ in Example 4, in which the ratio y of the oxygen atom number to the silicon atom number is 2 is used. The latter has a small charge and discharge capacity and inferior charge and discharge characteristics as compared with the battery D1 in which the silicon lower oxide SiO in which y is 1 is used. From this fact, it is understood that as the ratio y of the oxygen atom number to the silicon atom number, $0 < y < 1.5$ is especially suitable.

(Example 6)

In the present Example, the same silicon monoxide SiO as one used in Example 4 was ground and graded to a particle size of not more than 53 μm to be used as the active material of the working electrode. The active material was mixed with the same graphite as the one used in Example 4 as the conductive agent and the same cross-linked type acrylic acid resin and the like as the one used in Example 4 as the binding agent in a ratio of a weight ratio of 30:55:15 to provide a working electrode mixed agent. Thereafter, 95 mg of the working electrode mixed agent was pressurized and molded under 2 ton/cm$^2$ into a pellet having a diameter of 15 mm and a thickness of 0.3 mm to obtain the working electrode 5. A similar battery D2 was manufactured exactly in the same manner as Example 4 except that the working electrode thus manufactured was used.

Figure 9:
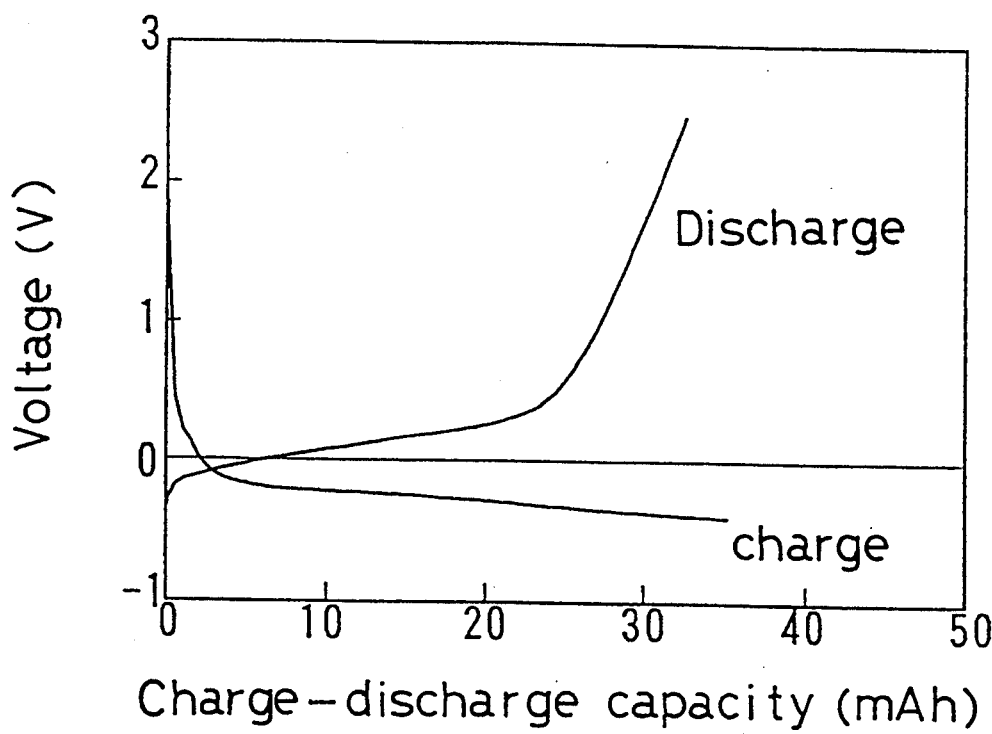
FIG. 9 is an explanatory view showing charge and discharge characteristics in the third cycle for the negative electrode active material of the battery according to the present invention.
Figure 10:
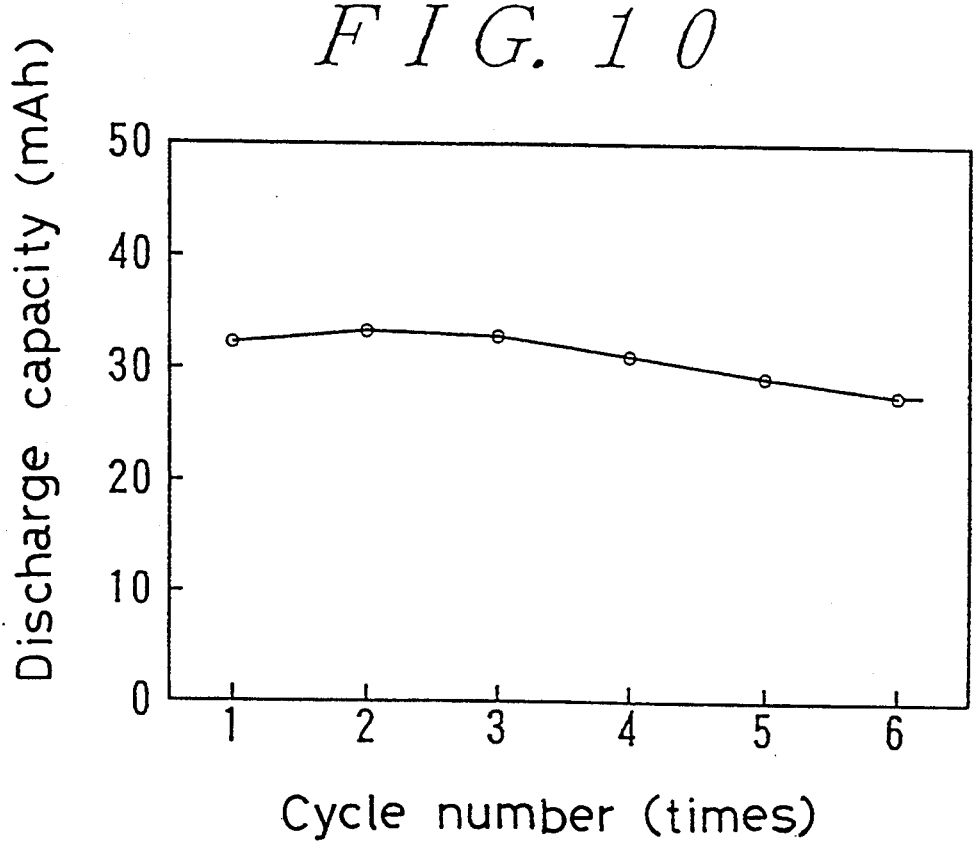
FIG. 10 is an explanatory view showing a cycle characteristic of the negative electrode active material of the battery according to the present invention.

Also for the battery D2 obtained in such a manner, the charge and discharge cycle test was performed in the same manner as Example 4 with a constant current of 1 mA under conditions of an end voltage of charge of −0.4 V and an end voltage of discharge of 2.5 V. In this case, the charge and discharge characteristic in the third cycle is shown in FIG. 9, and the cycle characteristic is shown in FIG. 10.

As clarified from the figure, the charge and discharge capacity in the third cycle is a high capacity of not less than 1100 mAh/g per 1 g of the active material SiO. Further, base region in which the working voltage is not more than 0.6 V with respect to the Li—Al alloy electrode (corresponding to about 1 V with respect to metallic lithium) occupies most parts, and the deterioration in the discharge capacity due to repeated charge and discharge (cycle deterioration) is small. The active material used in the present Example is especially suitable as the negative electrode active material for the non-aqueous electrolyte secondary battery.

(Example 7)

The situation of gas generation during charge and discharge was observed for cases of various non-aqueous electrolyte solutions. An electrochemical cell of the three-electrode type made of glass was used, and lithium metal was used for a counter electrode and a reference electrode. In addition, a working electrode was manufactured as follows. Silicon monoxide (SiO) ground and graded to a particle size of not more than 53 μm was mixed therewith with graphite as a conductive agent and a cross-liked type acrylic acid resin and the like as a binding agent in a ratio of a weight ratio of 65:20:15 to provide a working electrode combined agent. Thereafter, the working electrode combined agent was pressurized and molded under 2 ton/cm$^2$ into a pellet having a diameter of 15 mm and a thickness of 0.3 mm, followed by drying in vacuum at 200° C. for 10 hours to provide a working electrode. As electrolyte solutions, six species shown in Table 1 were used and compared.

It is considered that in an electrolyte solution containing Li ion, SiO electrochemically intercalates and deintercalates Li ion, and conducts a reaction shown in the formula 2. $SiO + xLi^+ + xe^- \rightleftarrows Li_xSiO$ (formula 2)

In such a cell, the resulting gas generation from the surface of the working electrode was observed while measuring the cyclic voltammogram (CV). The voltage range in CV was 0–3 V (vs Li/Li$^+$), the scanning velocity was 10 mV/second, and the scanning was performed several times.

TABLE 1

| electrolyte solution | | |
|---|---|---|
| solvent (figure in parentheses: volume ratio) | electrolyte (1 mol/l) | Amount of generated gas |
| PC | LiClO$_4$ | x |
| PC-DME (1:1) | LiClO$_4$ | x |
| PC-EC-DME (1:1:2) | LiClO$_4$ | ∆ |
| EC-DME (1:1) | LiClO$_4$ | ∆ |
| EC-DEC (1:1) | LiClO$_4$ | ○ |
| EC-DEC (1:1) | LiPF$_6$ | ○ |

○ ... none
∆ ... a little
x ... much

The resulting of gas generation obtained by the measurement as described above is shown in Table 1.

As shown in Table 1, the generation of gas can be considerably suppressed by adding EC into the electrolyte solution, and the gas generation can be substantially completely suppressed by further adding DEC to EC.

(Example 8)

In the present Example, the coin-shaped battery shown in FIG. 1 was used to compare and evaluate the difference in charge and discharge cycle characteristics depending on the difference in non-aqueous electrolyte solutions with respect to the negative electrode active material for the non-aqueous electrolyte secondary battery according to the present invention. Similar batteries were manufactured exactly in the same manner as Example 4 except that the working electrode 5 and the electrolyte solution were as follows, and the thickness of the lithium-aluminum laminated electrode as the counter electrode 3 was 1.5 times greater. The working electrode 5 was manufactured as follows. Silicon monoxide (SiO) ground and graded to have a particle size of not more than 53 μm was mixed therewith with graphite as a conductive agent and a cross-linked type acrylic resin and the like as a binding agent in a ratio of a weight ratio of 30:55:15 to provide a working electrode mixed agent. The latter was pressurized and molded under 2 ton/cm$^2$ into a pellet having a diameter of 15 mm and a thickness of 0.15 mm to obtain the working electrode 5.

As the electrolyte solutions, the following four species were used and compared: (g), in which LiClO$_4$ was dissolved by 1 mol/l in a 1:1 mixed solvent in a volume ratio of PC and DME; (h), in which LiClO$_4$ was dissolved by 1 mol/l in a 1:1 mixed solvent in a volume ratio of EC and DME; (i), in which LiClO$_4$ was dissolved by 1 mol/l in a 1:1 mixed solvent in a volume ratio of EC and DEC; and (j), in which LiPF$_6$ was dissolved by 1 mol/l in a 1:1 mixed solvent in a volume ratio of EC and DEC.

The batteries manufactured as described above are abbreviated hereinafter as the batteries G, H, I and J corresponding respectively to each of the electrolyte solutions g, h, i and j used.

Figure 11:
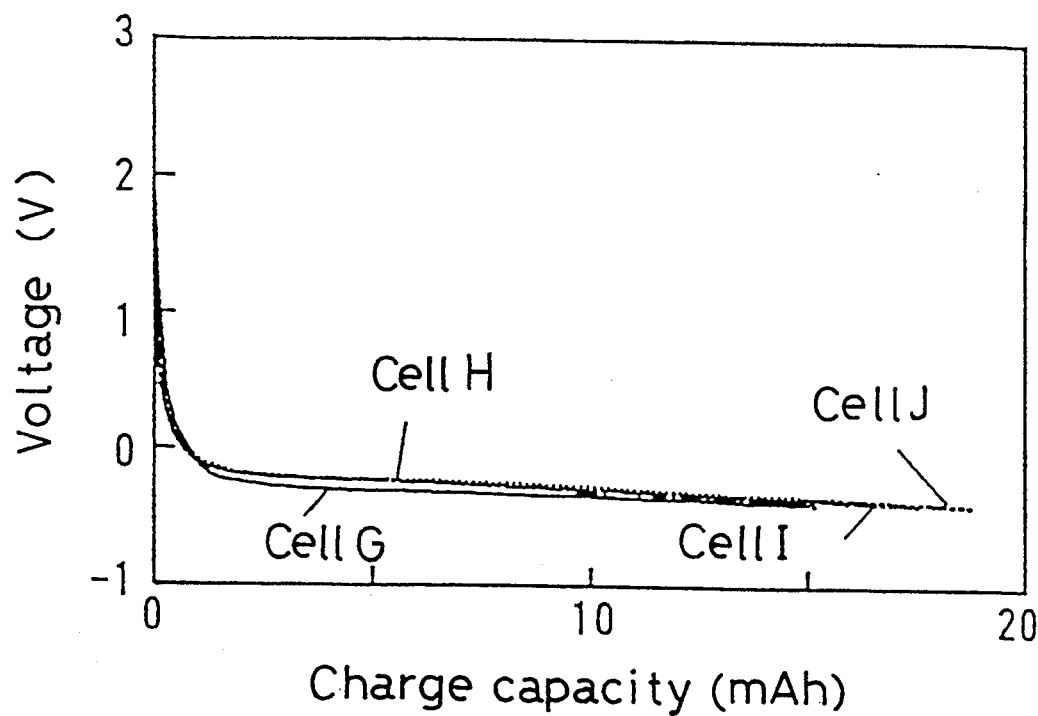
FIG. 11 is an explanatory view showing comparison of charge characteristics in the fifth cycle in various electrolytes for the negative electrode active material of the battery according to the present invention.
Figure 12:
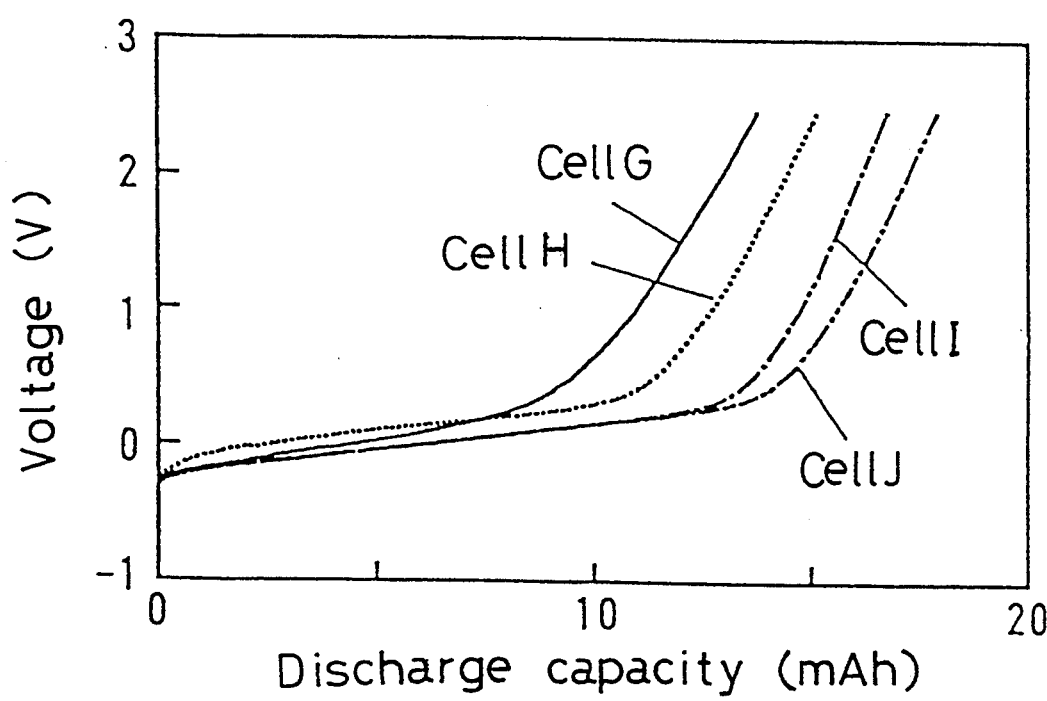
FIG. 12 is an explanatory view showing comparison of discharge characteristics in the fifth cycle in various electrolytes for the negative electrode active material of the battery according to the present invention.
Figure 13:
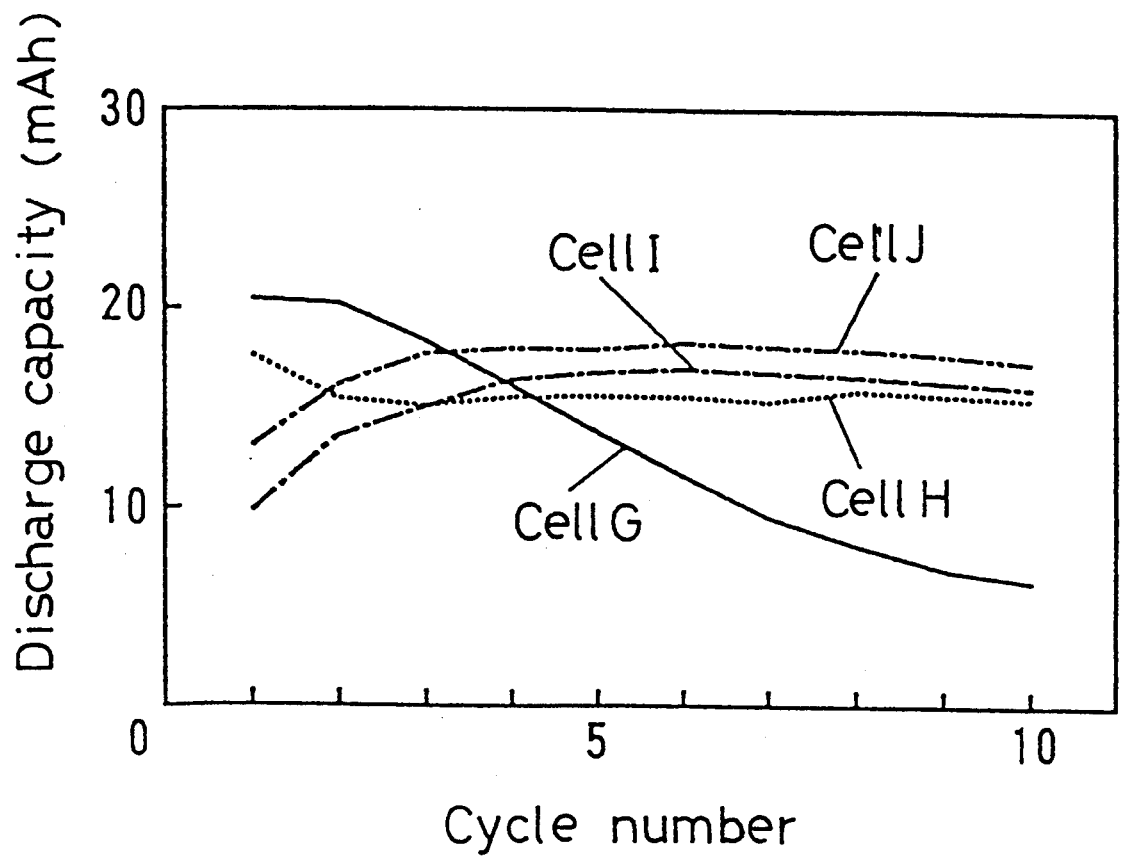
FIG. 13 is an explanatory view showing comparison of cycle characteristics in various electrolytes for the negative electrode active material of the battery according to the present invention.

For the batteries manufactured as described above, there are shown charge characteristics in the fifth cycle in FIG. 11, discharge characteristics in FIG. 12 and cycle characteristics in 1–10th cycles in FIG. 13. Charge and discharge cycles were made in the same manner as Example 4 with a constant current of 1 mA under conditions of an end voltage of charge (in a current direction to perform a battery reaction to absorb lithium ion into the working electrode) of −0.4 V and an end voltage of discharge (in a current direction to perform a battery reaction to release lithium ion from the working electrode) of 2.5 V. The charge and discharge cycles started by charge.

As clarified from FIGS. 11–13, by allowing the electrolyte solutions to contain EC, the charge and discharge capacity became large, the capacity loss decreased, and the charge and discharge cycle life also became long. In addition, when the solvent of the electrolyte solution was constituted by EC and DEC, better results were obtained.

(Example 9)

Figure 14:
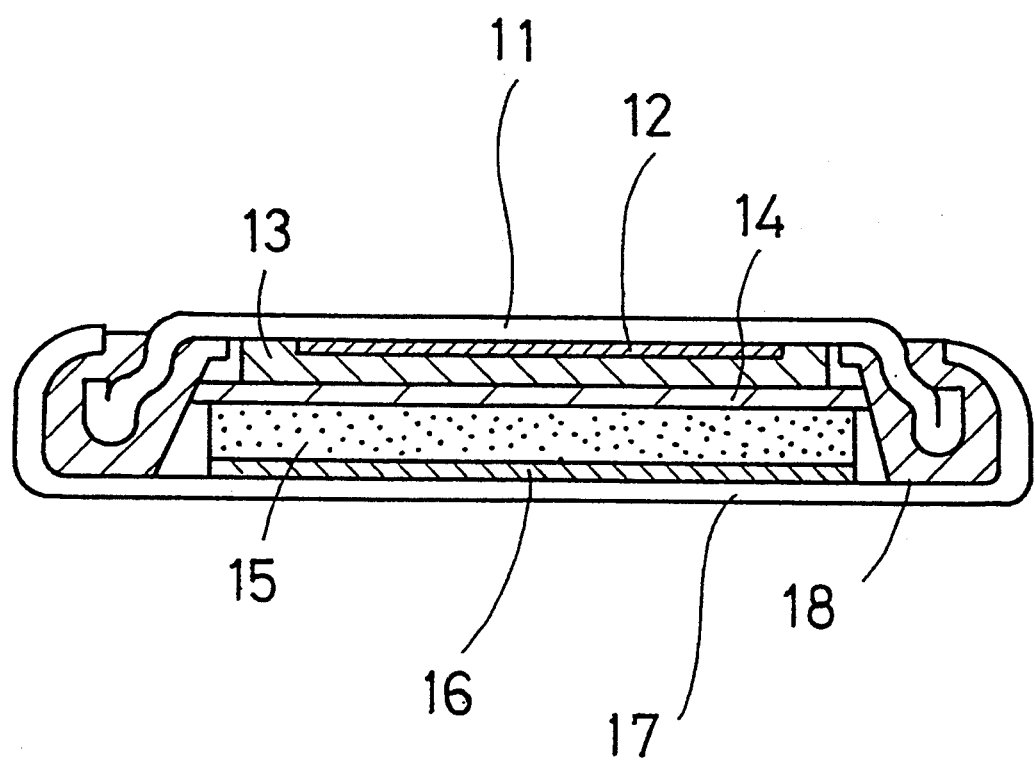
FIG. 14 is an explanatory view showing one example of a structure of the battery carried out in the present invention.

FIG. 14 is a cross-sectional view of a coin type battery showing one example of a non-aqueous electrolyte secondary battery according to the present invention. In FIG. 14, 1.1 is a negative electrode case which also serves as a negative electrode terminal, in which a plate made of stainless steel having one outside face subjected to Ni plating has been subjected to drawing processing. 13 is a negative electrode constituted by using a negative electrode active material according to the present invention as described hereinafter, which is adhered to the negative electrode case 11 by a negative electrode collector 12 comprising a conductive adhesive using carbon as a conductive filler. 17 is a positive electrode case made of stainless steel having one outside face subjected to Ni plating, which also serves as a positive electrode terminal. 15 is a positive electrode constituted by using a positive electrode active material according to the present invention as described hereinafter, which is adhered to the positive electrode case 17 by a positive electrode collector 16 comprising a conductive adhesive using carbon as a conductive filler. 14 is a separator composed of a porous film of polypropylene, in which an electrolyte solution is impregnated. 18 is a gasket mainly composed of polypropylene, which intervenes between the negative electrode case 11 and the positive electrode case 17, maintains the electric insulation between the negative electrode and the positive electrode, and simultaneously tightly encloses and seals the battery contents by inwardly folding an opening edge of the positive electrode case to be caulked. The electrolyte solution used was lithium perchlorate LiClO$_4$ dissolved by 1 mol/l in a 1:1:2 mixed solvent in a volume ratio of propylene carbonate, ethylene carbonate and 1,2-dimethoxyethane. The size of the battery was 20 mm in outer diameter and 1.6 mm in thickness.

The negative electrode 13 was manufactured as follows. Commercially available silicon monoxide SiO having a purity of 99.9% was ground and graded with an automatic mortar to a particle size of not more than 53 μm to provide a negative electrode active material according to the present invention. The negative electrode active material was mixed graphite as a conductive agent, and a cross-linked type acrylic acid resin and the like as a binding agent in a ratio of a weight ratio of 65:20:15 to provide a negative electrode mixed agent. The negative electrode mixed agent was then pressurized and molded under 2 ton/cm$^2$ into a pellet having a diameter of 15 mm and a thickness of 0.19 mm, followed by heating and drying under a reduced pressure at 200° C. for 10 hours to provide the negative electrode.

The positive electrode 15 was manufactured as follows. Lithium hydroxide LiOH H$_2$O and cobalt carbonate CoCO$_3$ were weighed to give a mole ratio of Li:Co of 1:1, which were sufficiently mixed using a mortar, and then the mixture was heated and calcined in atmospheric air at a temperature of 850° C. for 12 hours. The mixture was then cooled and thereafter ground and graded to a particle size of not more than 53 μm to provide a positive electrode active material. The calcining, grinding and grading were repeated twice to synthesize the positive electrode active material LiCoO$_2$ of the present Example.

The positive electrode active material was mixed with graphite as a conductive agent, and a fluororesin and the like as a binding agent in a ratio of a weight ratio of 80:15:5 to provide a positive electrode mixed agent. The positive electrode mixed agent was then pressurized and molded under 2 ton/cm$^2$ into a pellet having a diameter of 16.2 mm and a thickness of 0.71 mm, followed by heating and drying under a reduced pressure at 100° C. for 10 hours to provide the positive electrode.

A battery manufactured in such a manner (designated as battery K) was left at room temperature for 1 week to perform aging, followed by performing a charge and discharge test as described hereinafter.

Figure 15:
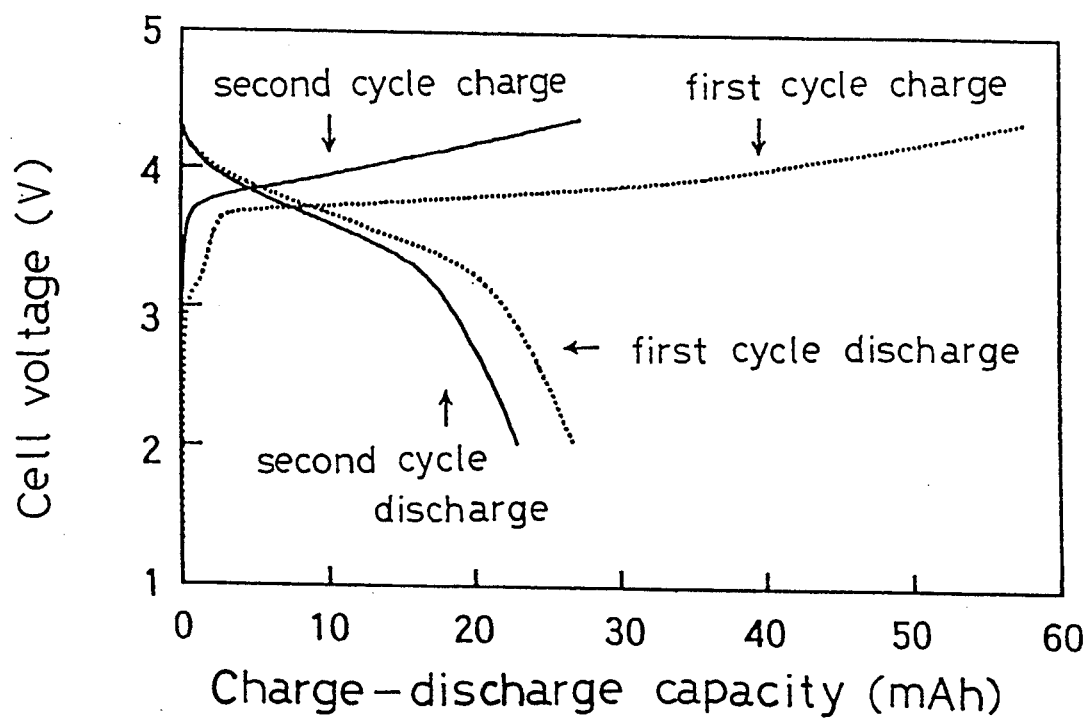
FIG 15 is an explanatory view showing charge and discharge characteristics in the first cycle and the second cycle of the battery according to the present invention.
Figure 16:
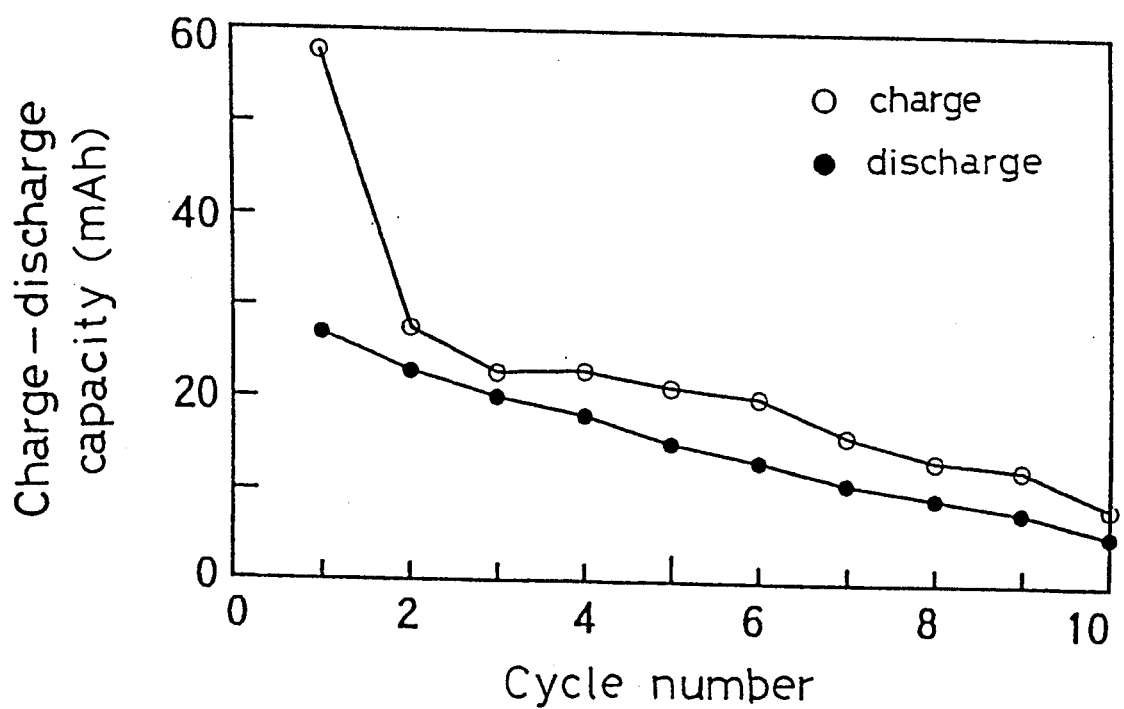
FIG. 16 is an explanatory view showing cycle characteristics of the battery according to the present invention.

For the battery K, there are shown charge and discharge characteristics in the first cycle and the second cycle in FIG. 15 and cycle characteristics in FIG. 16, charge and discharge cycles were made with a constant current of 1 mA under conditions of an end voltage of charge of 4.4 V and an end voltage of discharge of 2.0 V. Incidentally, the charge and discharge cycles started by charge.

In the battery K, lithium ion is released during the charge cycle from the positive electrode active material into the electrolyte solution. The lithium ion then moves in the electrolyte solution to perform an electrode reaction with the negative electrode active material and is electrochemically absorbed into the negative electrode active material. A composite oxide Li$_x$SiO of lithium and silicon is thus generated. Next, during discharge, lithium ion is released into the electrolyte solution from the composite oxide of lithium and silicon of the negative electrode and is absorbed by the positive electrode active material. It is thus possible to repeatedly perform charge and discharge in a stable manner. In this case, after the generation of the composite oxide containing lithium Li$_x$SiO by the first charge, the negative electrode active material forms the silicon composite oxide containing lithium Li$_x$SiO except for the case of complete discharge in the following discharge and charge cycles.

As clarified from FIGS. 15–16, it is understood that the battery K according to the present invention has a considerably large charge and discharge capacity. In addition, the decrease in the discharge capacity with respect to the charge capacity (charge and discharge efficiency) is considerably small except for the first cycle, and the decrease in the discharge capacity due to repeated charge and discharge (cycle deterioration) is also small. Further, it is understood that the difference in working voltages of charge and discharge is considerably small over the entire charge and discharge region, the polarization of the battery (internal resistance) is considerably small, and it is easy to perform charge and discharge with a large current.

With respect to the fairly large decrease in the discharge capacity in the first cycle with respect to the charge capacity in the first cycle (initial loss), the major cause of this is a side reaction which occurs between Li and the graphite added as the conductive agent to the negative electrode combined agent, and the binding agent and the like, when lithium ion is electrochemically absorbed into the negative electrode active material in the charge in the first cycle. The side reaction is due to the existence of Li which is absorbed by SiO as the negative electrode active material and remains without release during discharge.

(Example 10)

In the present Example, a similar battery L was manufactured exactly in the same manner as Example 9 except that a negative electrode 23 and a positive electrode 25 manufactured as described below were used instead of the negative electrode 13 and the positive electrode 15 in Example 9.

The negative electrode 23 was manufactured as follows. The same negative electrode active material and the negative electrode mixed agent as those in Example 9 were used, which were pressurized and molded under 2 ton/cm$^2$ into a pellet having a diameter of 15 mm and a thickness of 0.28 mm to obtain a negative electrode pellet. The negative electrode pellet was adhered to the negative electrode case 11 using the negative electrode collector 12 composed of a conductive adhesive using carbon as the conductive filler, which was heated and dried under a reduced pressure at 200° C. for 10 hours, and then one obtained by punching a lithium foil having a predetermined thickness into a diameter of 14 mm was applied by pressure onto the negative electrode pellet. The lithium-negative electrode pellet laminated electrode obtained in such a manner was used as the negative electrode.

The positive electrode 25 was manufactured as follows. Lithium hydroxide LiOH H$_2$O, cobalt carbonate CoCO$_3$ and boron oxide B$_2$O$_3$ were weighed to give a mole ratio of Li:Co:B of 1:0.9:0.1, which were sufficiently mixed using a mortar. The mixture was then heated and calcined in atmospheric air at a temperature of 850° C. for 12 hours, which was cooled and then ground and graded to a particle size of not more than 53 $\mu$mm. The calcining, grinding and grading were repeated twice to synthesize a positive electrode active material LiCo$_{0.9}$B$_{0.1}$O$_2$ according to the present invention.

The positive electrode active material was mixed with graphite as a conductive agent and a fluororesin and the like as a binding agent in a ratio of a weight ratio of 80:15:5 to provide a positive electrode mixed agent. The positive electrode mixed agent was pressurized and molded under 2 ton/cm$^2$ into a pellet having a diameter of 16.2 mm and a thickness of 0.52 mm, followed by heating and drying under a reduced pressure at 100° C. for 10 hours to provide the positive electrode.

The battery manufactured in such a manner (hereinafter abbreviated as the battery L) was left at room temperature for 1 week to perform aging, and then a charge and discharge test as described hereinafter was performed. Owing to the aging, the lithium-negative electrode pellet laminated electrode of the negative electrode 23 voluntarily reacted as a result of the contact with the non-aqueous electrolyte solution in the battery, and substantially all of the lithium foil was electrochemically incorporated into the negative electrode combined agent.

Figure 17:
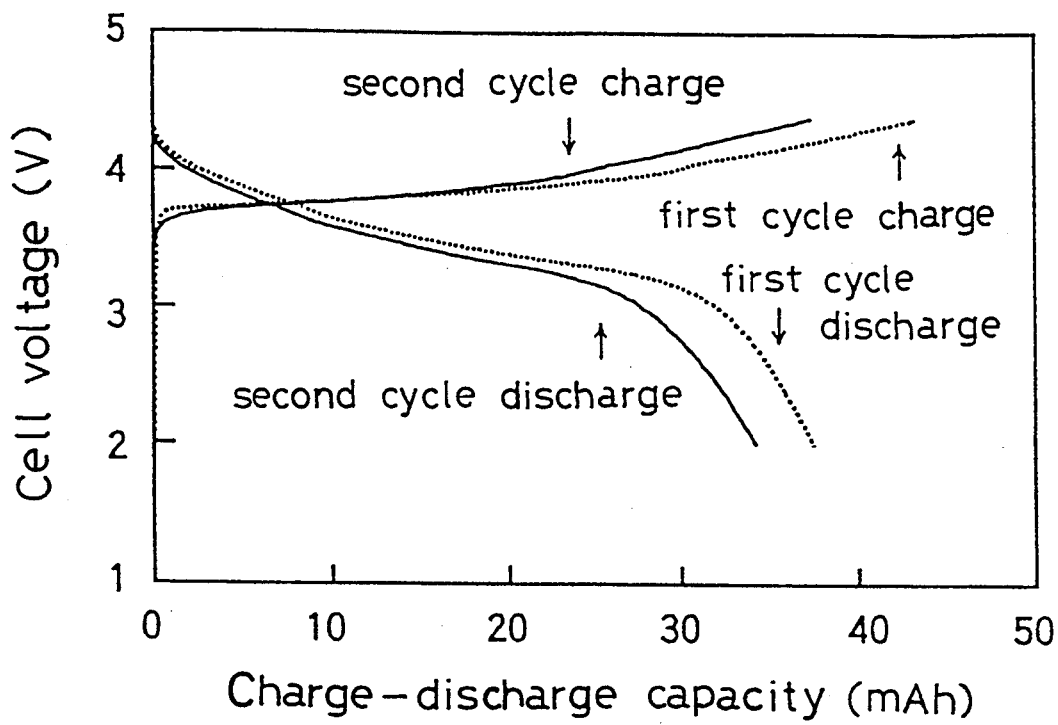
FIG. 17 This is an explanatory view showing charge and discharge characteristics in the first cycle and the second cycle of the battery according to the present invention.
Figure 18:
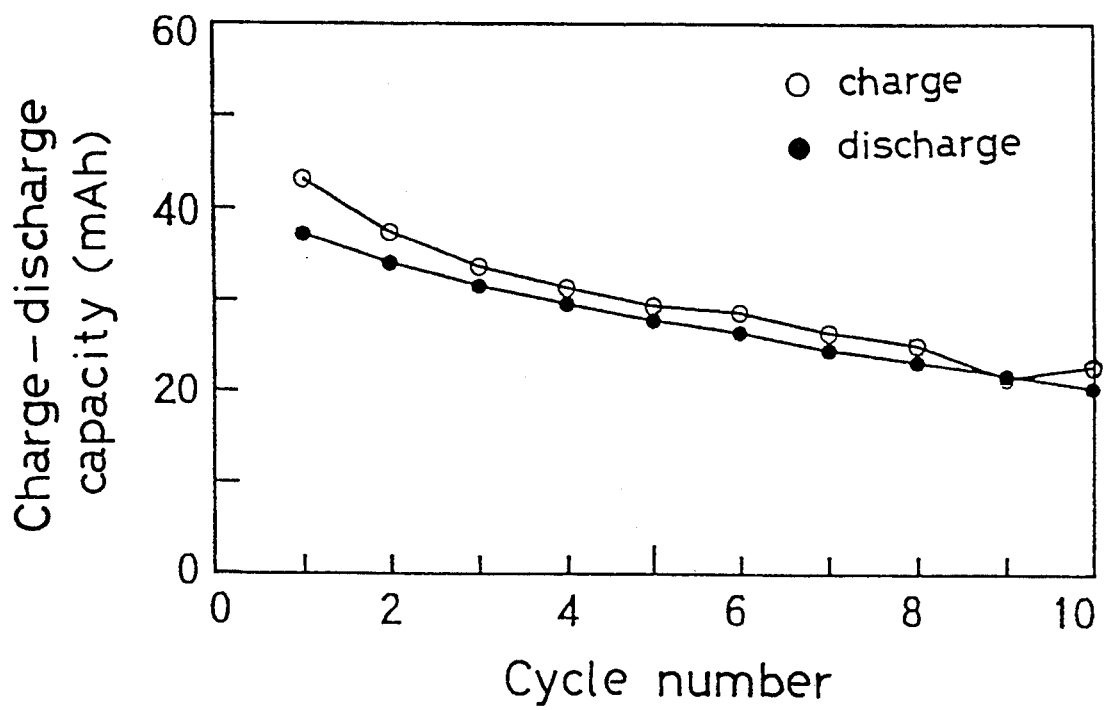
FIG. 18 is an explanatory view showing cycle characteristics of the battery according to the present invention.

In addition for the battery L obtained in such a manner, the charge and discharge cycle test was performed in the same manner as Example 9 with a constant current of 1 mA under conditions of an end voltage of charge of 4.4 V and an end voltage of discharge of 2.0 V. Charge and discharge characteristics in the first cycle and second cycle are shown in FIG. 17, and the cycle characteristics are shown in FIG. 18.

As clarified from the figures, it is understood that the battery L of the present Example has considerably excellent charge and discharge characteristics as compared with the battery K in Example 9. Particularly, there is little decrease in the discharge capacity in the first cycle with respect to the charge capacity in the first cycle (initial loss), and it is understood that this is a considerable improvement over the battery K in Example 9. This is due to the fact that the lithium of an amount corresponding to lithium ion generated in accordance with charge and discharge, lithium which is absorbed into SiO during a side reaction with a conductive agent, a binding agent and the like and during charge and remains without release during discharge and the like is laminated beforehand with the negative electrode combined agent to assemble the battery. After assembling the battery, the lithium is allowed to volutarily react with the negative electrode combined agent to be absorbed by allowing the laminated electrode to contact with the electrolyte solution in the battery, so that subsequent loss of lithium does not occur in the negative electrode during charge and discharge.

In addition, it is understood that owing to the use of the composite oxide containing boron as the positive electrode active material, the cycle deterioration is considerably improved.

(Example 11)

The present Example resides in a case in which a positive electrode active material and an electrolyte solution as described below were used instead of the positive electrode active material and the electrolyte solution in Example 10. A similar battery was manufactured exactly in the same manner as Example 10 except for the positive electrode active material and the electrolyte solution.

The positive electrode active material of the present Example was manufactured as follows. Lithium hydroxide LiOH H$_2$O, cobalt carbonate CoCO$_3$ and silicon dioxide SiO$_2$ were weighed to give a mole ratio of Li:Co:Si of 1:0.9:0.1, which were sufficiently mixed using a mortar. The mixture was then heated and calcined in atmospheric air at a temperature of 850° C. for 12 hours. Thereafter, then mixture was cooled and then ground and graded to a particle size not more than 53 μm. The calcining, grinding and grading were repeated twice to obtain a layer-like structure composite oxide having an approximate composition of $LiCo_{0.9}B_{0.1}O_2$. The resulting product was used as the positive electrode active material according to the present invention.

The electrolyte solution was produced by dissolving $LiPF_6$ by 1 mol/l in a 1:1 mixed solvent in volume ratio of EC and DEC.

Figure 19:
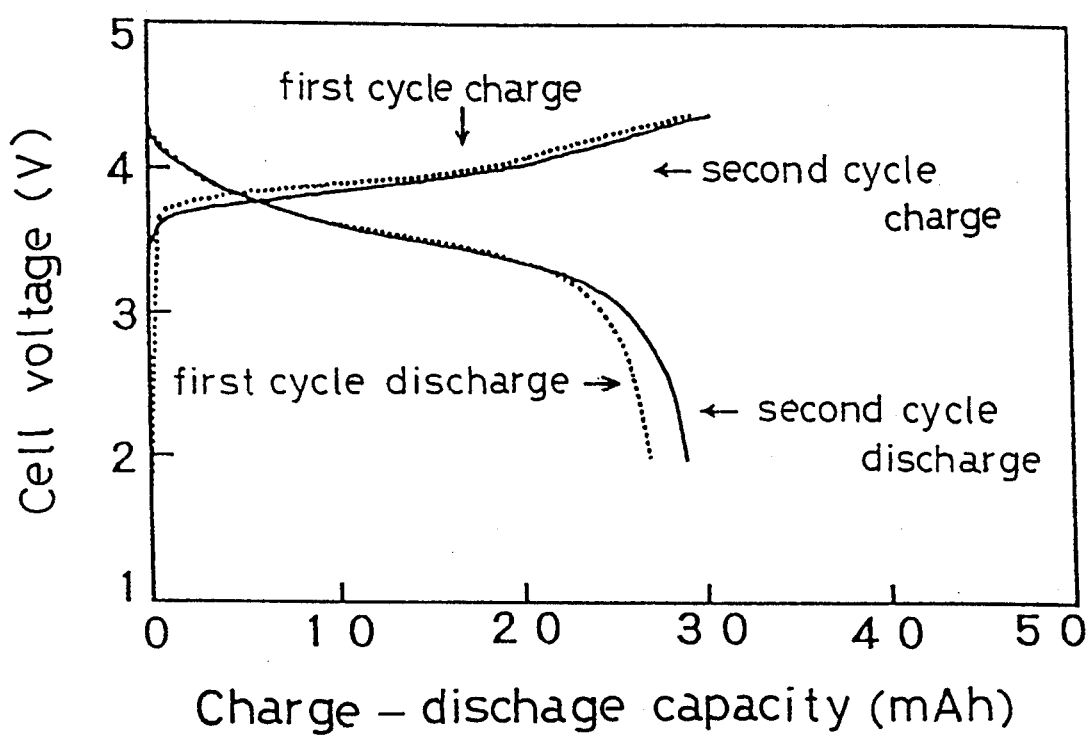
FIG. 19 is an explanatory view showing charge and discharge characteristics in the first cycle and the second cycle of the battery according to the present invention.
Figure 20:
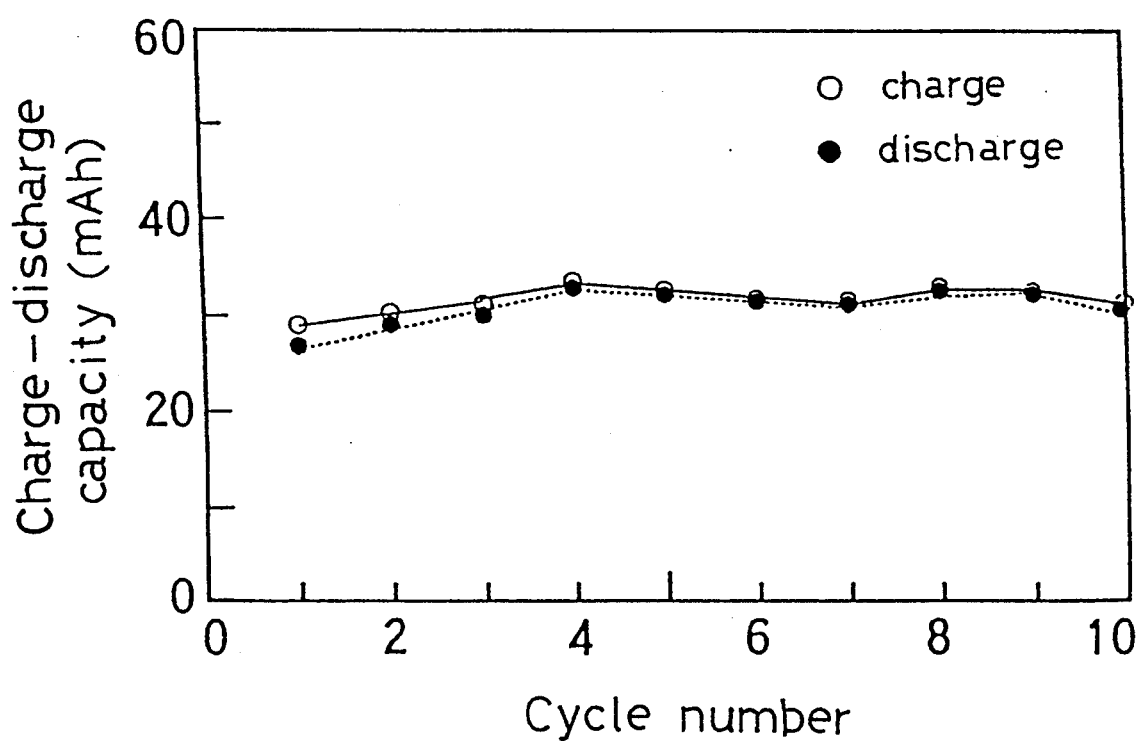
FIG. 20 is an explanatory view showing cycle characteristics of the battery according to the present invention.

Also for the battery obtained in such a manner (abbreviated as the battery M), the charge and discharge cycle test was performed in the same manner as Examples 9 and 10 with a constant current of 1 mA under conditions of an end voltage of charge of 4.4 V and an end voltage of discharge of 2.0 V. Charge and discharge characteristics in the first cycle and second cycle are shown in FIG. 19, and the cycle characteristics are shown in FIG. 20.

As clarified from the figures, it is understood that the battery M of the present Example has more improved charge and discharge characteristics than the battery L in Example 10. Namely, it is understood that owing to the fact that the composite oxide containing silicon is used as the positive electrode active material, the charge and discharge capacity obtained is equivalent to that of the battery L which uses the composite oxide containing boron. Further, owing to the fact that the mixed solvent comprising EC and DEC is used as the electrolyte solvent, the cycle deterioration is considerably improved as compared with the battery L which uses the electrolyte solvent containing PC and containing no DEC.

(Example 12)

Instead of the electrolyte solution used in Example 11 an electrolyte solution was used one in which $LiPF_6$ was dissolved by 1 mol/l in a 1:1 mixed solvent in volume ratio of EC and DMC. A similar battery N was manufactured in the same manner as Example 11 except for the electrolyte solution.

The internal resistance of the battery N obtained in such a manner, which was measured by the alternating current method at 1 kHz and 1 mA, was 6 Ω being reduced to a half as compared with 11 Ω in the case of the battery M in Example 11. As a result of a charge and discharge cycle test conducted for the battery N in the same manner as in Example 11, the charge and discharge capacity for each cycle increased by about 20% as compared with the battery M, and the decrease in the discharge capacity due to repeated charge and discharge (cycle deterioration) was at approximately the same level as that of the battery M. Namely, the use of the mixed solvent of EC and DMC as the electrolyte solution provides improved charge and discharge characteristics than the use of the mixed solvent of EC and DEC.

As described above in detail, in the present invention, as the negative electrode active material for the non-aqueous electrolyte secondary battery is used the novel active material comprising the silicon oxide or the silicate containing lithium, and with respect to the negative electrode active material, in the base potential region of 0–1 V with respect to the lithium reference electrode (metallic lithium), the amount capable of reversibly absorbing and releasing lithium ion by charge and discharge, that is the charge and discharge capacity, is considerably large, and the polarization of charge and discharge is small, so that it is possible to obtain the secondary battery having a high voltage and a high energy density in which the charge and discharge characteristics are excellent with a large current. In addition, little deterioration such as the generation of irreversible substances and the like due to excessive charge and excessive discharge is observed. An extremely stable secondary battery having a long cycle life is thus obtained.

Particularly, when the silicon lower oxide containing lithium $Li_xSiO_2$ (wherein $x>0$, $2>y>0$) is used, the charge and discharge capacity is especially large, the polarization during charge and discharge is small, and it is easy to perform charge and discharge with a large current, which is highly desirable.

In addition, the secondary battery is comprises the layer-like structure composite oxide $Li_aM_bL_cO_2$ containing silicon and/or boron as the positive electrode active material together with the negative electrode active material. Thus, a secondary battery having a high working voltage of about 4 V is obtained in which the energy density is higher, the charge and discharge characteristics are excellent, the deterioration due to excessive charge and excessive discharge is small, and the cycle life is long.

Further, the use of the non-aqueous electrolyte containing ethylene carbonate as the electrolyte together with the negative electrode active material, is highly desirable. Thus, a secondary battery in which the cycle life is especially long and the reliability is high is obtained.

What is claimed is:

1. A non-aqueous electrolyte secondary battery comprising: a negative electrode; a positive electrode; and a lithium ion-conductive non-aqueous electrolyte; wherein the negative electrode has an active material comprised of a silicon oxide containing lithium.

2. A non-aqueous electrolyte secondary battery according to claim 1; wherein the silicon oxide containing lithium is represented by composition formula $Li_xSiO_y$ where x satisfies $x \geq 0$, and y satisfies $2 > y > 0$.

3. A non-aqueous electrolyte secondary battery according to claims 1 or 2; wherein the silicon oxide containing lithium is amorphous.

4. A non-aqueous electrolyte secondary battery according to claims 1 or 2; wherein the positive electrode has an active material comprised of a composite oxide represented by composition formula $Li_aM_bL_cO_2$ and has a layer-like structure, where M is a transition metal element, L is one or more species of metalloid elements selected from boron B and silicon Si, and a,b and c satisfy $0 < a \leq 1.15$, $0.85 \leq b+c \leq 1.3$ and $0 \leq c$.

5. A non-aqueous electrolyte secondary battery according to claims 1 or 2; wherein the non-aqueous electrolyte comprises at least a non-aqueous solvent containing ethylene carbonate and a supporting electrolyte containing lithium ion.

6. A non-aqueous electrolyte secondary battery according to claim 5; wherein the non-aqueous electrolyte further comprises an R.R' type alkyl carbonate represented by a formula 1,

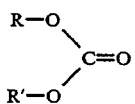

where R and R' are alkyl groups indicated as $C_nH_{2n+1}$ in formula 1.

7. A non-aqueous electrolyte secondary battery according to claim 6; wherein the R.R' type alkyl carbonate is dimethyl carbonate.

8. A non-aqueous electrolyte secondary battery according to claim 6; wherein the R.R' type alkyl carbonate is diethyl carbonate.

9. A non-aqueous electrolyte secondary battery comprising: a negative electrode; a positive electrode; and a lithium ion-conductive non-aqueous electrolyte; wherein the negative electrode has an active material comprised of a silicate containing lithium.

10. A non-aqueous electrolyte secondary battery according to claim 9; wherein the silicate containing lithium is amorphous.

11. A non-aqueous electrolyte secondary battery according to claim 9 or 10; wherein the positive electrode has an active material comprised of a composite oxide represented by composition formula $Li_aM_bL_cO_2$ and has a layer-like structure, where M is a transition metal element, L is one or more species of metalloid elements selected from boron B and silicon Si, and a, b and c satisfy $0 < a \leq 1.15$, $0.85 \leq b+c \leq 1.3$ and $O \leq c$.

12. A non-aqueous electrolyte secondary battery according to claim 9 or 10; wherein the non-aqueous electrolyte comprises at least a non-aqueous solvent containing ethylene carbonate and a supporting electrolyte containing lithium ion.

13. A non-aqueous electrolyte secondary battery according to claim 12; wherein the non-aqueous electrolyte further comprises an R.R' type alkyl carbonate represented by a formula 1.

where R and R' are alkyl groups indicated as $C_nH_{2n+1}$ in formula 1.

14. A non-aqueous electrolyte secondary battery according to claim 13; wherein the R.R' type alkyl carbonate is dimethyl carbonate.

15. A non-aqueous electrolyte secondary battery according to claim 13; wherein the R.R' type alkyl carbonate is diethyl carbonate.

* * * * *